US010671221B2

(12) United States Patent
Kaneda

(10) Patent No.: US 10,671,221 B2
(45) Date of Patent: Jun. 2, 2020

(54) DISPLAY APPARATUS WITH DETECTION FUNCTION

(71) Applicant: SONY CORPORATION, Tokyo (JP)

(72) Inventor: Kazumasa Kaneda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/325,335

(22) PCT Filed: Sep. 7, 2017

(86) PCT No.: PCT/JP2017/032263
§ 371 (c)(1),
(2) Date: Feb. 13, 2019

(87) PCT Pub. No.: WO2018/051886
PCT Pub. Date: Mar. 22, 2018

(65) Prior Publication Data
US 2019/0204990 A1    Jul. 4, 2019

(30) Foreign Application Priority Data

Sep. 13, 2016  (JP) .................................. 2016-178405

(51) Int. Cl.
*G06F 3/042* (2006.01)
*H04N 5/74* (2006.01)
(Continued)

(52) U.S. Cl.
CPC .......... *G06F 3/0425* (2013.01); *A63F 13/213* (2014.09); *A63F 13/214* (2014.09);
(Continued)

(58) Field of Classification Search
CPC ...... G06F 3/0425; G06F 3/042; G06F 3/0426; G06F 1/1639; G06F 3/005; G02B 27/283;
(Continued)

(56) References Cited

U.S. PATENT DOCUMENTS

| 8,876,298 B2 * | 11/2014 | Chikaoka | G09G 3/025 |
| | | | 353/30 |
| 2007/0222760 A1 * | 9/2007 | Lieberman | G06F 3/0426 |
| | | | 345/168 |

(Continued)

FOREIGN PATENT DOCUMENTS

| CN | 103299259 A | 9/2013 |
| CN | 104024936 A | 9/2014 |

(Continued)

OTHER PUBLICATIONS

Extended European Search Report of EP Application No. 17850789.3, dated May 31, 2019, 08 pages.

(Continued)

*Primary Examiner* — Koosha Sharifi-Tafreshi
(74) *Attorney, Agent, or Firm* — Chip Law Group

(57) ABSTRACT

A display apparatus with detection function of the present disclosure includes a first illumination unit that outputs first illumination light, a light valve that generates image light by modulating the first illumination light on the basis of image data, a projection optical system that projects the image light onto a projection plane, a second illumination unit that outputs second illumination light used for position detection of a position detection object on the projection plane, a third illumination unit that outputs third illumination light used for image recognition of an image recognition object on the projection plane, an imaging unit where the second illumination light and the third illumination light enter through the projection optical system, and includes an imaging device disposed at an optically conjugate position with the light valve, and an image processing unit that performs position detection of the position detection object and image recognition of the image recognition object on the basis of a result of imaging by the imaging unit.

20 Claims, 19 Drawing Sheets

(51) Int. Cl.
*G03B 21/00* (2006.01)
*G03B 21/14* (2006.01)
*A63F 13/213* (2014.01)
*A63F 13/214* (2014.01)
*A63F 13/25* (2014.01)
*G06K 9/00* (2006.01)
*G06K 9/20* (2006.01)

(52) U.S. Cl.
CPC ............. *A63F 13/25* (2014.09); *G03B 21/00* (2013.01); *G03B 21/14* (2013.01); *G06F 3/042* (2013.01); *G06K 9/00624* (2013.01); *G06K 9/2036* (2013.01); *H04N 5/74* (2013.01); *A63F 2300/1068* (2013.01); *A63F 2300/1087* (2013.01); *A63F 2300/30* (2013.01)

(58) Field of Classification Search
CPC .. G02B 13/0095; G02B 5/3058; G02B 13/16; G02B 27/0905; G02B 27/0966; H04N 9/3197
See application file for complete search history.

(56) References Cited

U.S. PATENT DOCUMENTS

| | | | |
|---|---|---|---|
| 2013/0314380 A1* | 11/2013 | Kuribayashi | G06F 3/0425 345/175 |
| 2013/0343601 A1 | 12/2013 | Jia et al. | |
| 2014/0139717 A1 | 5/2014 | Short | |
| 2016/0196005 A1 | 7/2016 | Kaneda | |
| 2016/0255278 A1 | 9/2016 | Short | |
| 2017/0309029 A1 | 10/2017 | Wang et al. | |

FOREIGN PATENT DOCUMENTS

| | | |
|---|---|---|
| CN | 105474092 A | 4/2016 |
| CN | 107079112 A | 8/2017 |
| EP | 2748675 A1 | 7/2014 |
| EP | 2687959 A4 | 10/2014 |
| EP | 3039483 A1 | 7/2016 |
| EP | 3213504 A1 | 9/2017 |
| JP | 60-244920 A | 12/1985 |
| JP | 2003-044839 A | 2/2003 |
| JP | 2008-128792 A | 6/2008 |
| JP | 2012-208926 A | 10/2012 |
| JP | 2014-529921 A | 11/2014 |
| JP | 2015-064550 A | 4/2015 |
| JP | 5941146 B2 | 6/2016 |
| KR | 10-2014-0054025 A | 5/2014 |
| TW | 201630408 A | 8/2016 |
| WO | 2012/124730 A1 | 9/2012 |
| WO | 2013/019255 A1 | 2/2013 |
| WO | 2015/029365 A1 | 3/2015 |
| WO | 2016/068890 A1 | 5/2016 |

OTHER PUBLICATIONS

International Search Report and Written Opinion of PCT Application No. PCT/JP2017/032263, dated Nov. 21, 2017, 10 pages of ISRWO.

* cited by examiner

[FIG. 1]
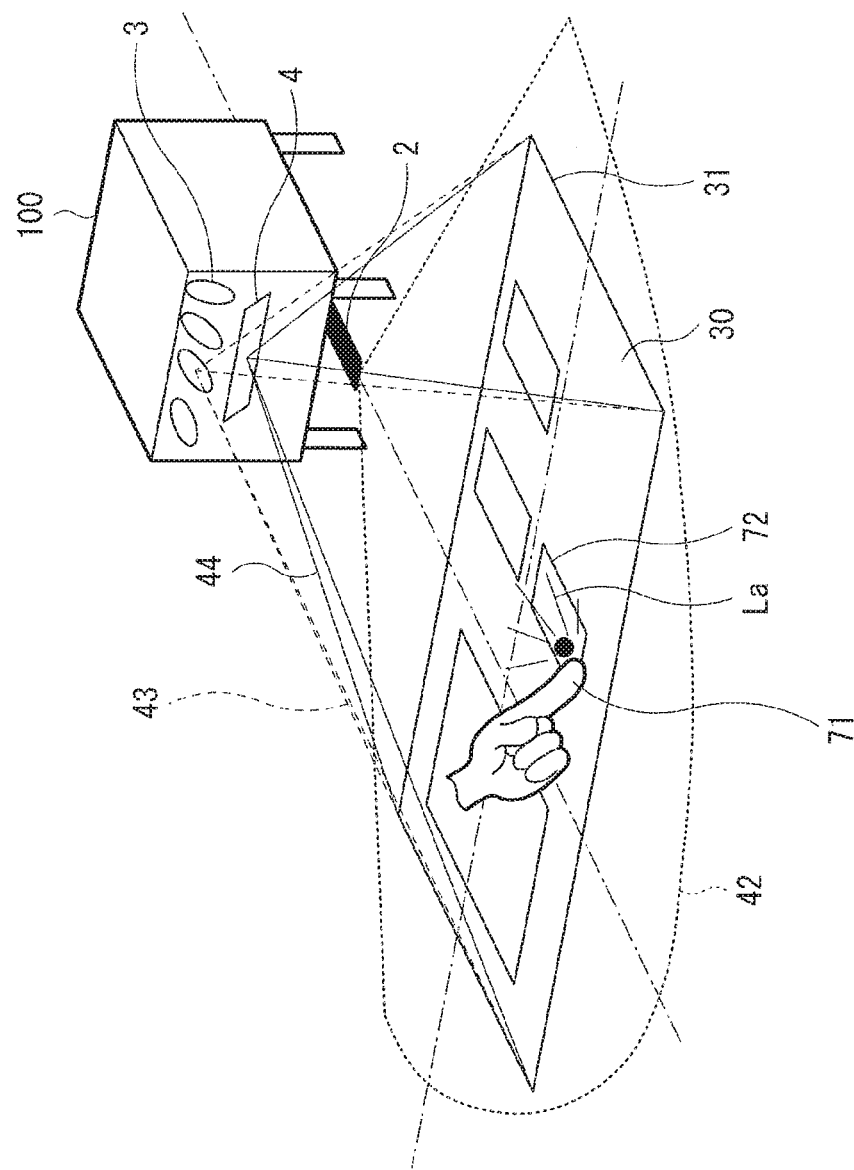

[FIG. 2]
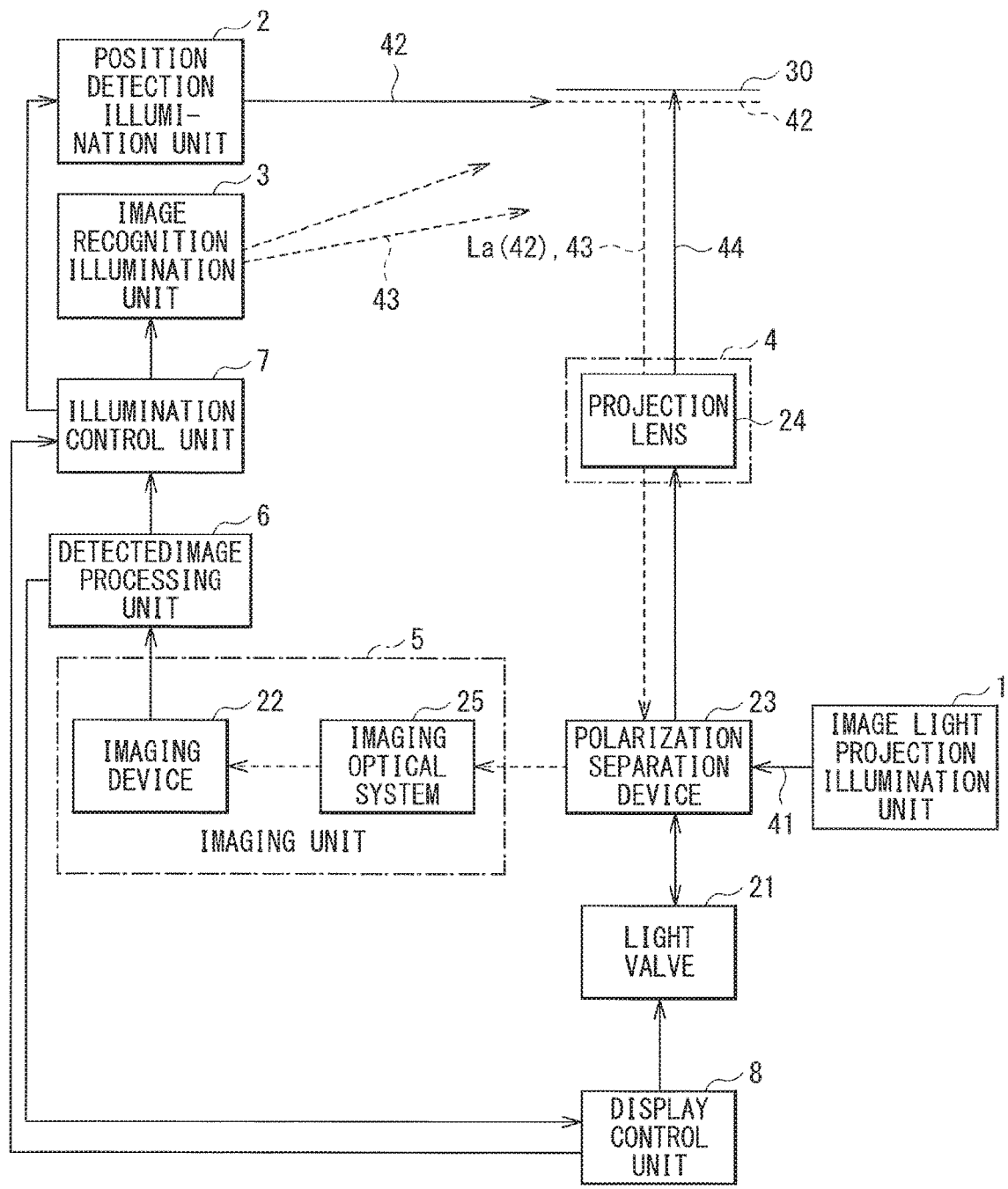

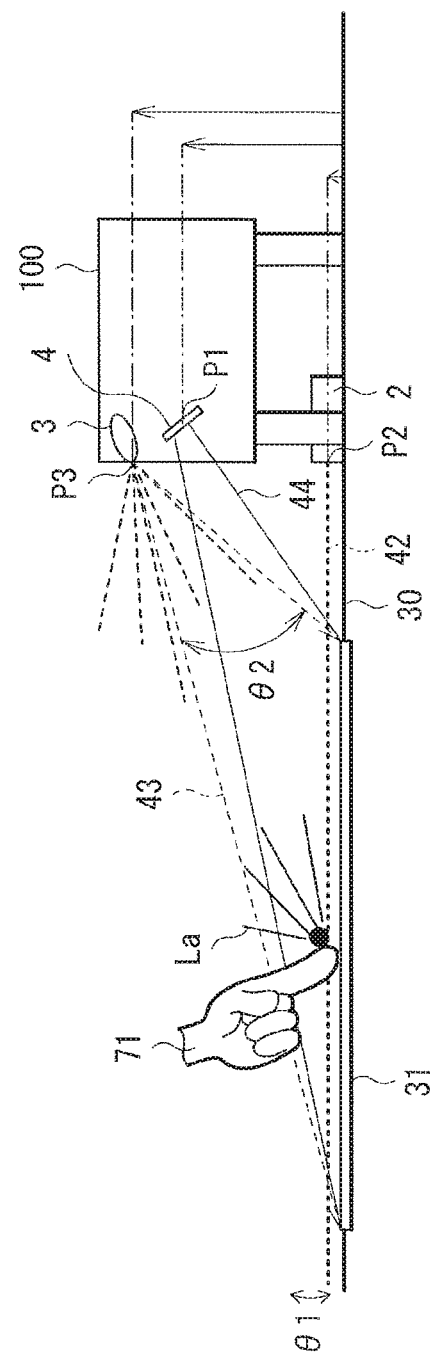

[FIG. 4]
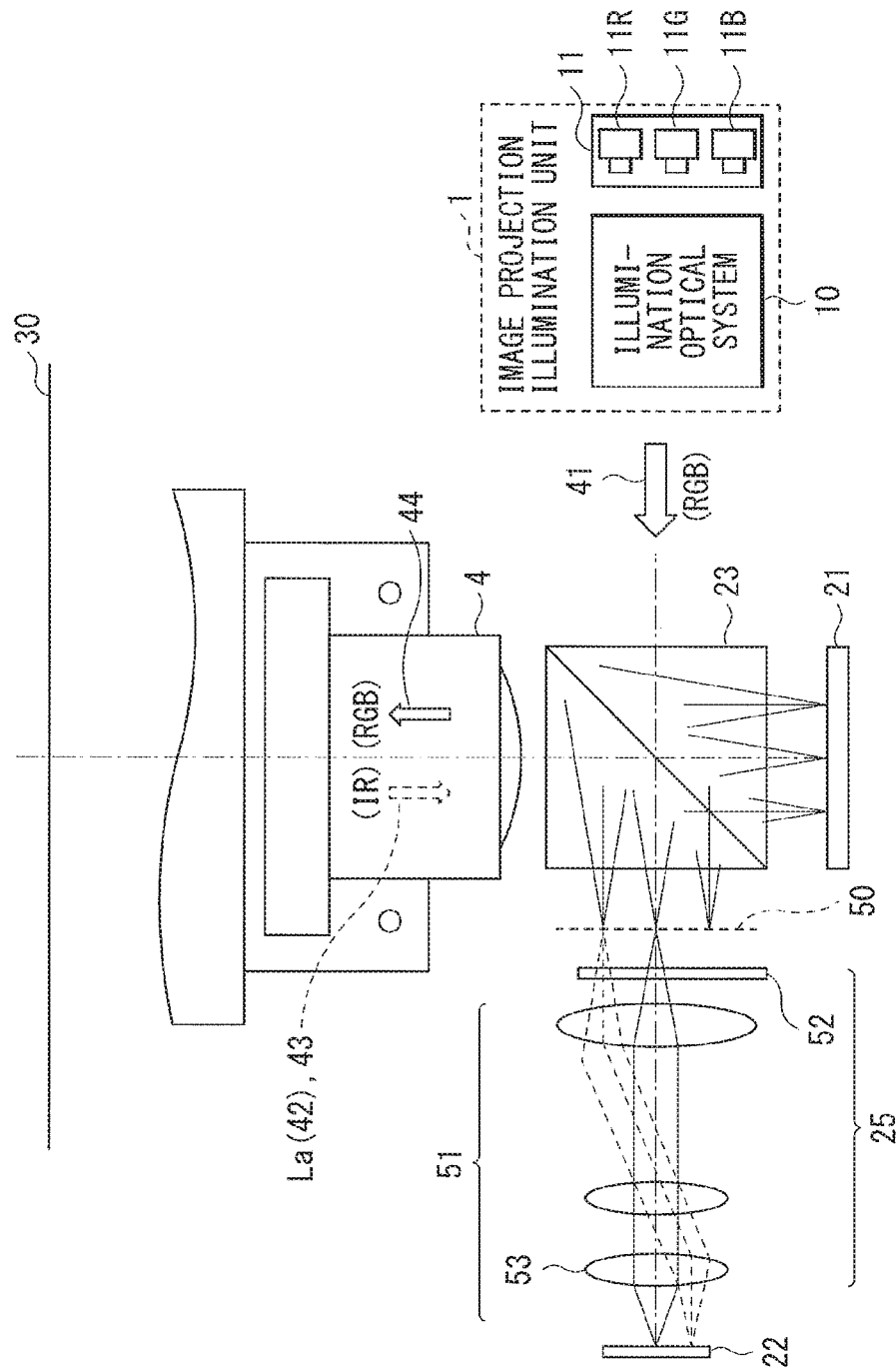

[FIG. 5]
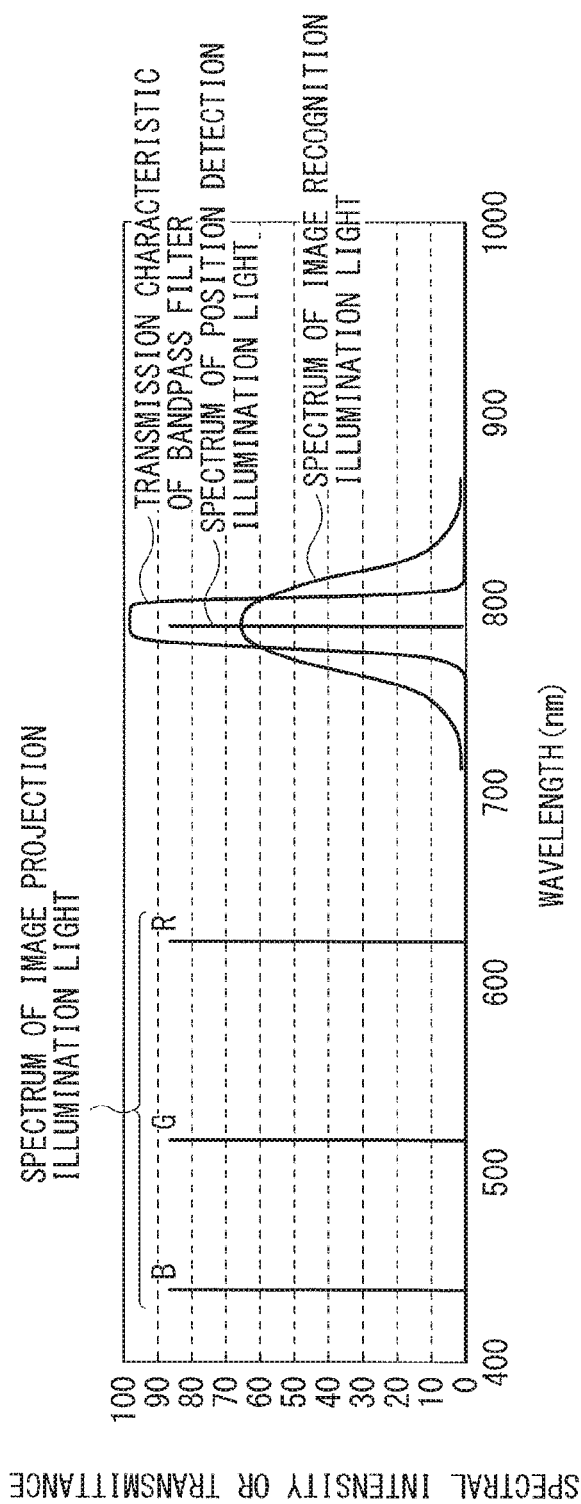

[FIG. 6]
IMAGE RECOGNITION MODE
(IMAGE RECOGNITION ILLUMINATION IS ON,
POSITION DETECTION ILLUMINATION IS OFF)
[FIG. 7]
POSITION DETECTION MODE
(IMAGE RECOGNITION ILLUMINATION IS OFF,
POSITION DETECTION ILLUMINATION IS ON)
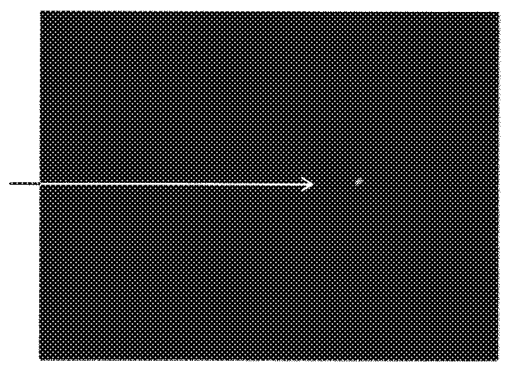

[ FIG. 8 ]
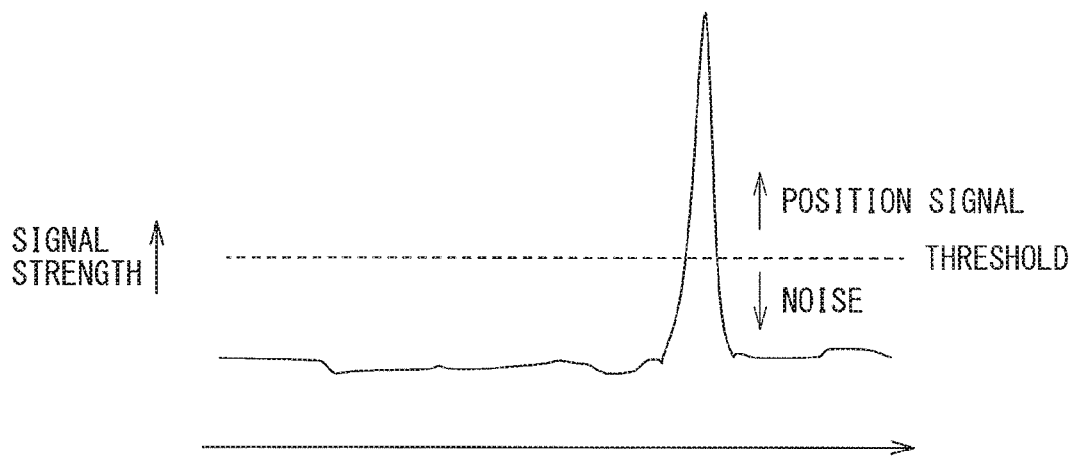
[ FIG. 9 ]
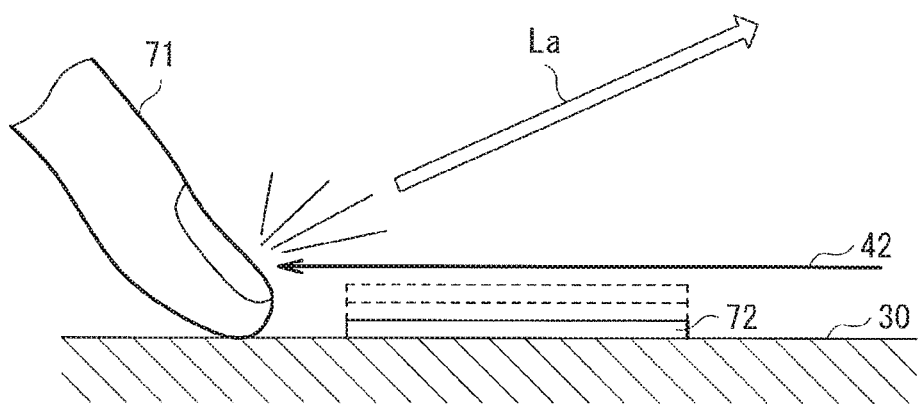

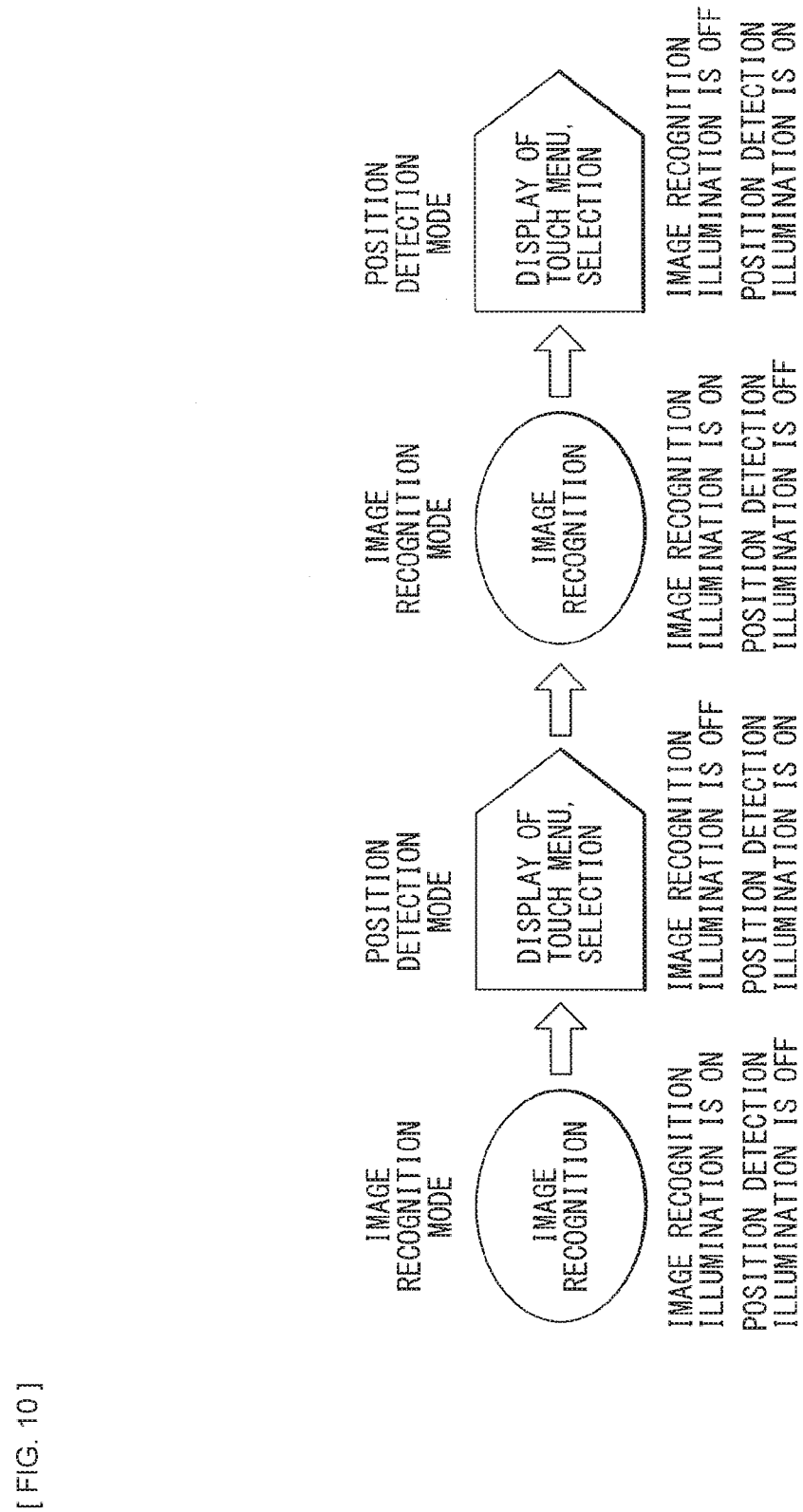
[FIG. 10]

[ FIG. 11 ]
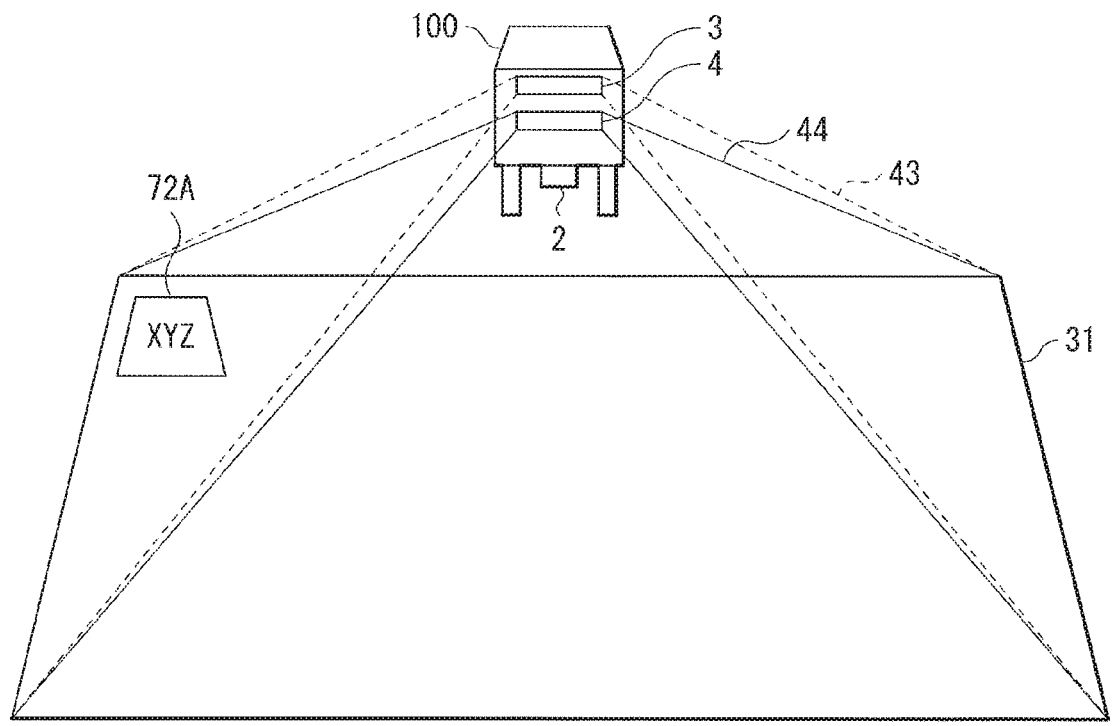
[ FIG. 12 ]
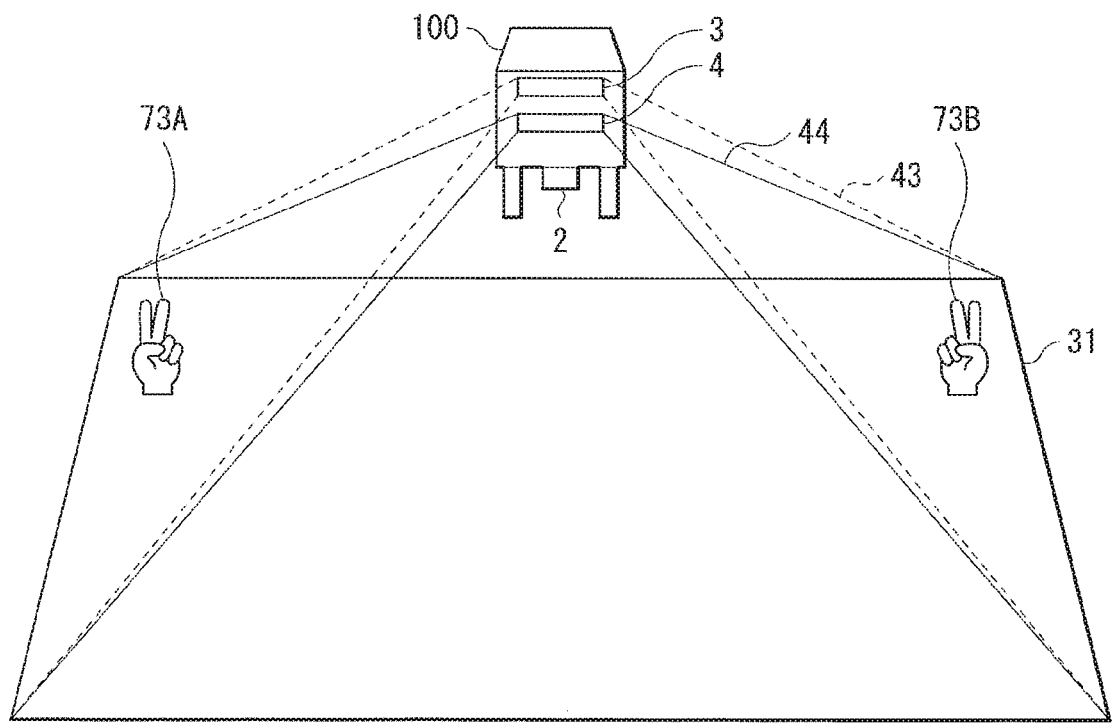

[ FIG. 13 ]
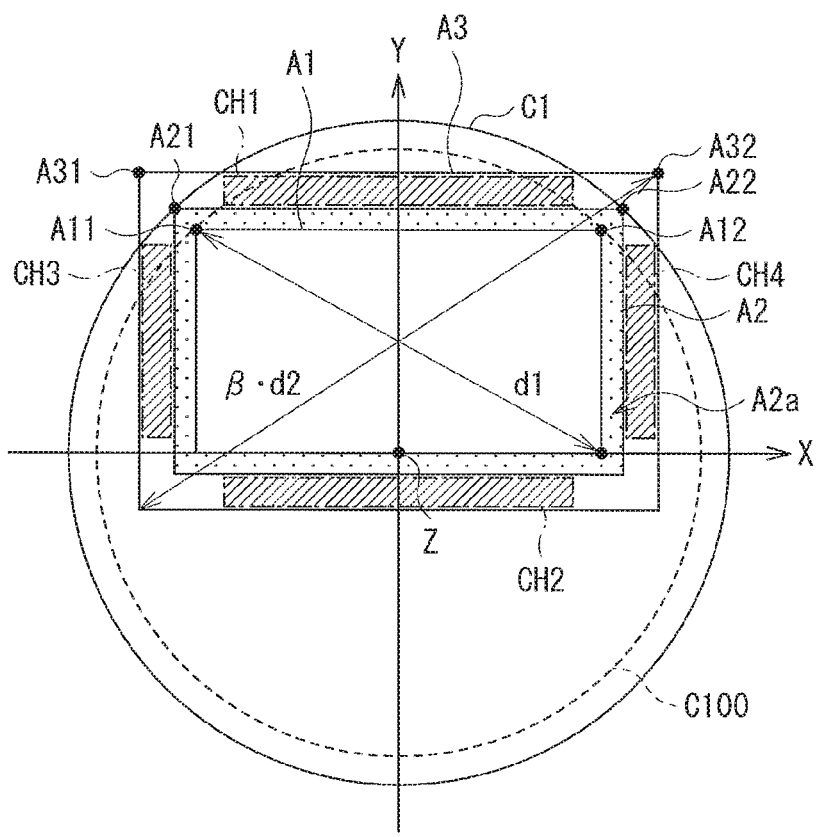
[ FIG. 14 ]
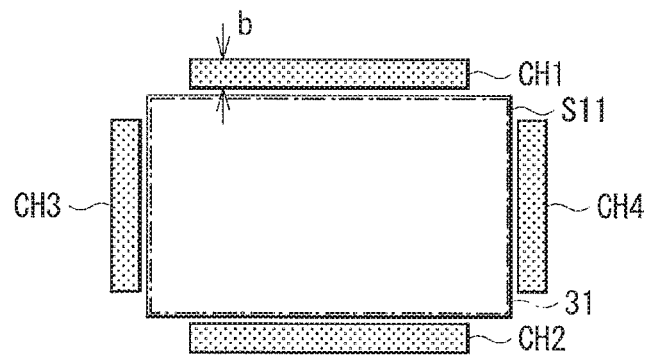

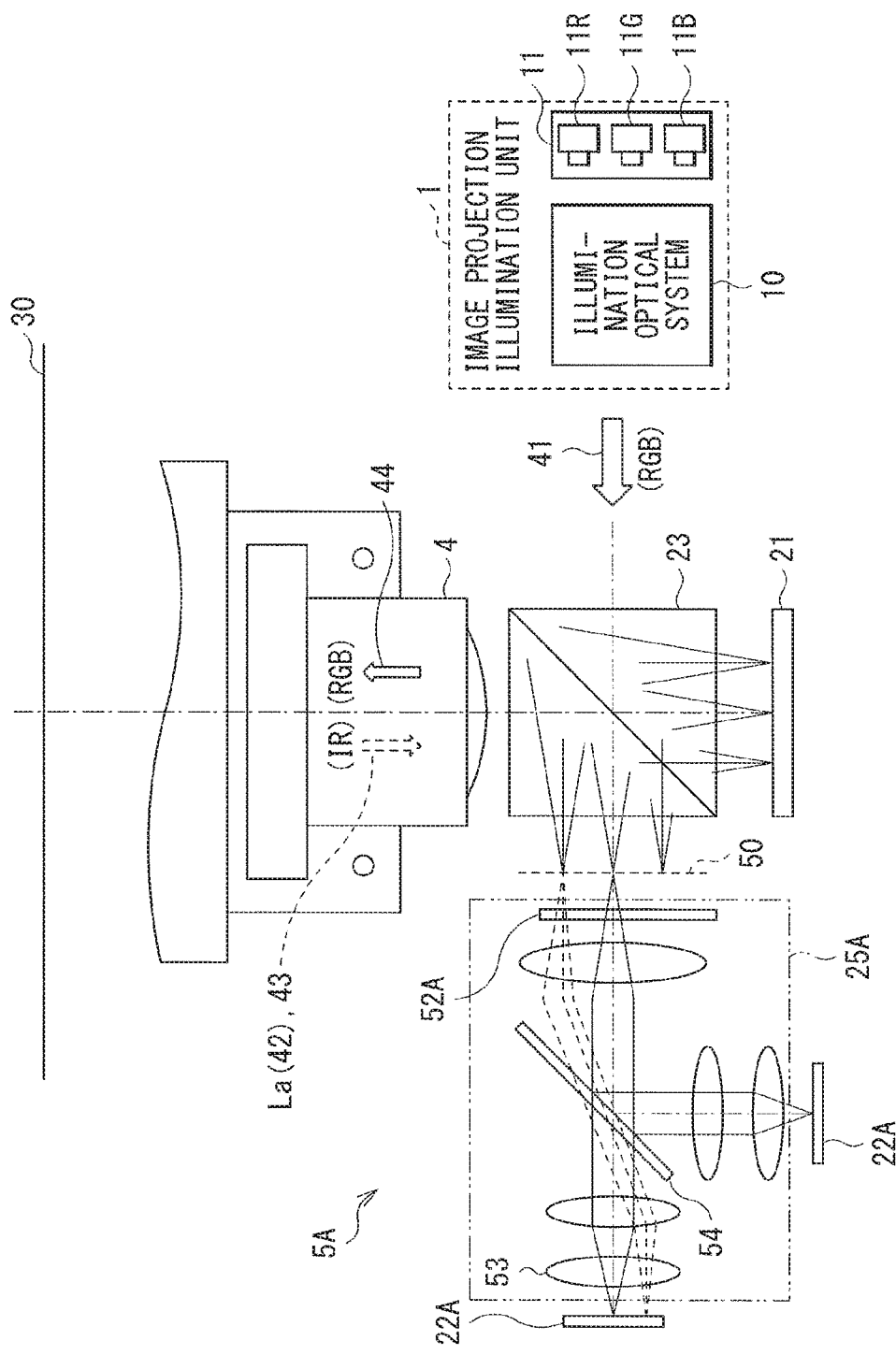
[FIG. 15]

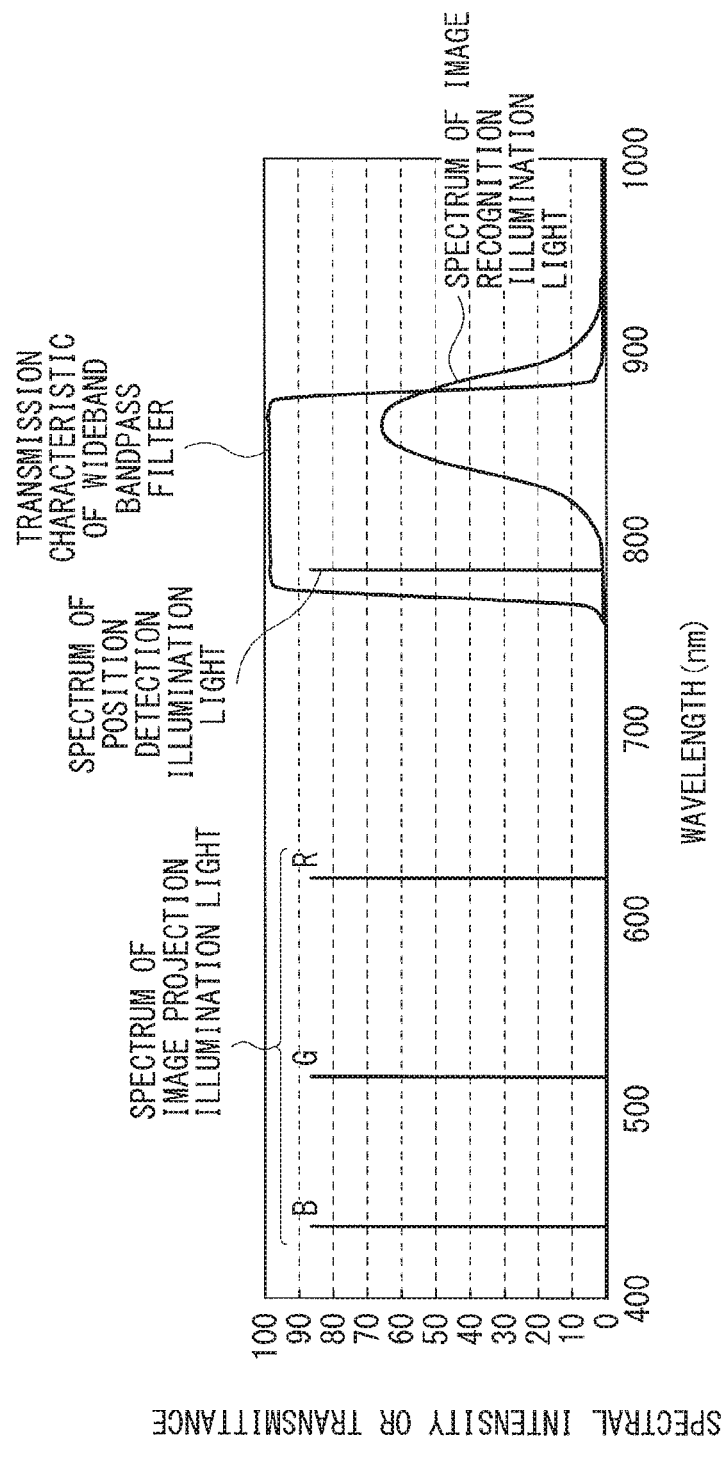
[FIG. 16]

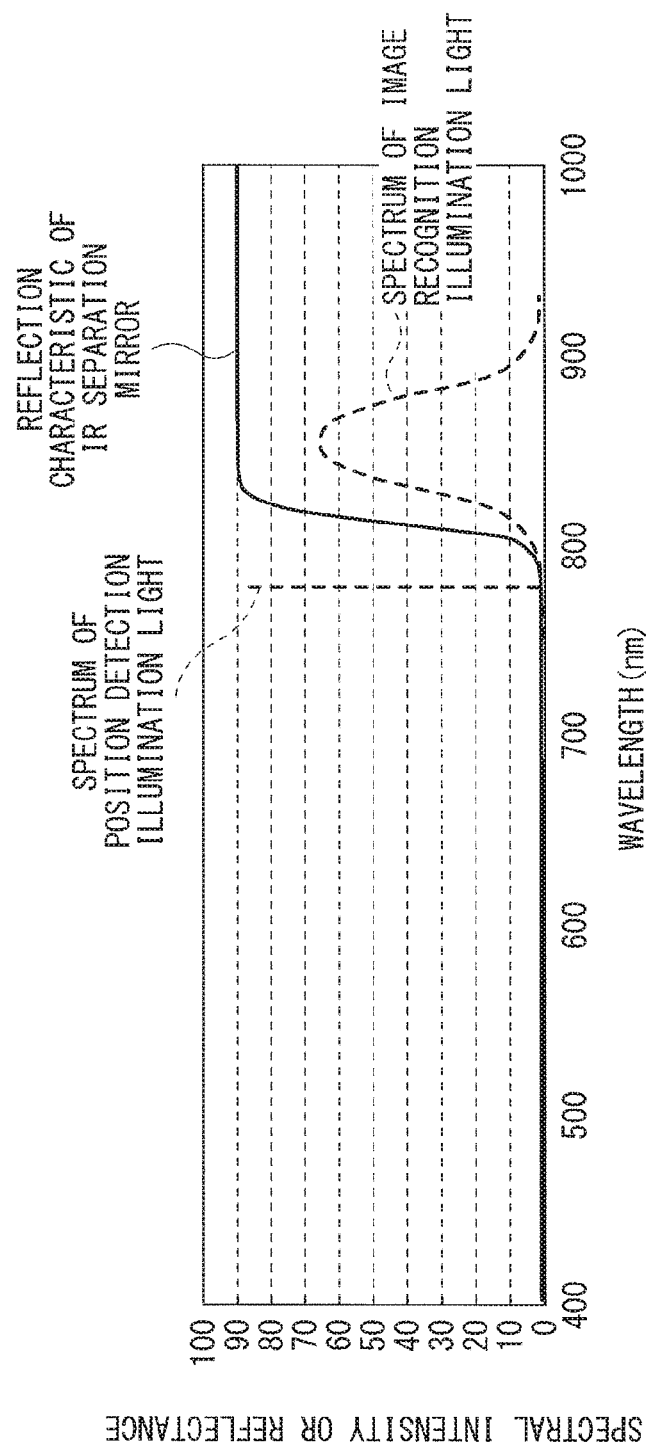
[FIG. 17]

[ FIG. 18 ]

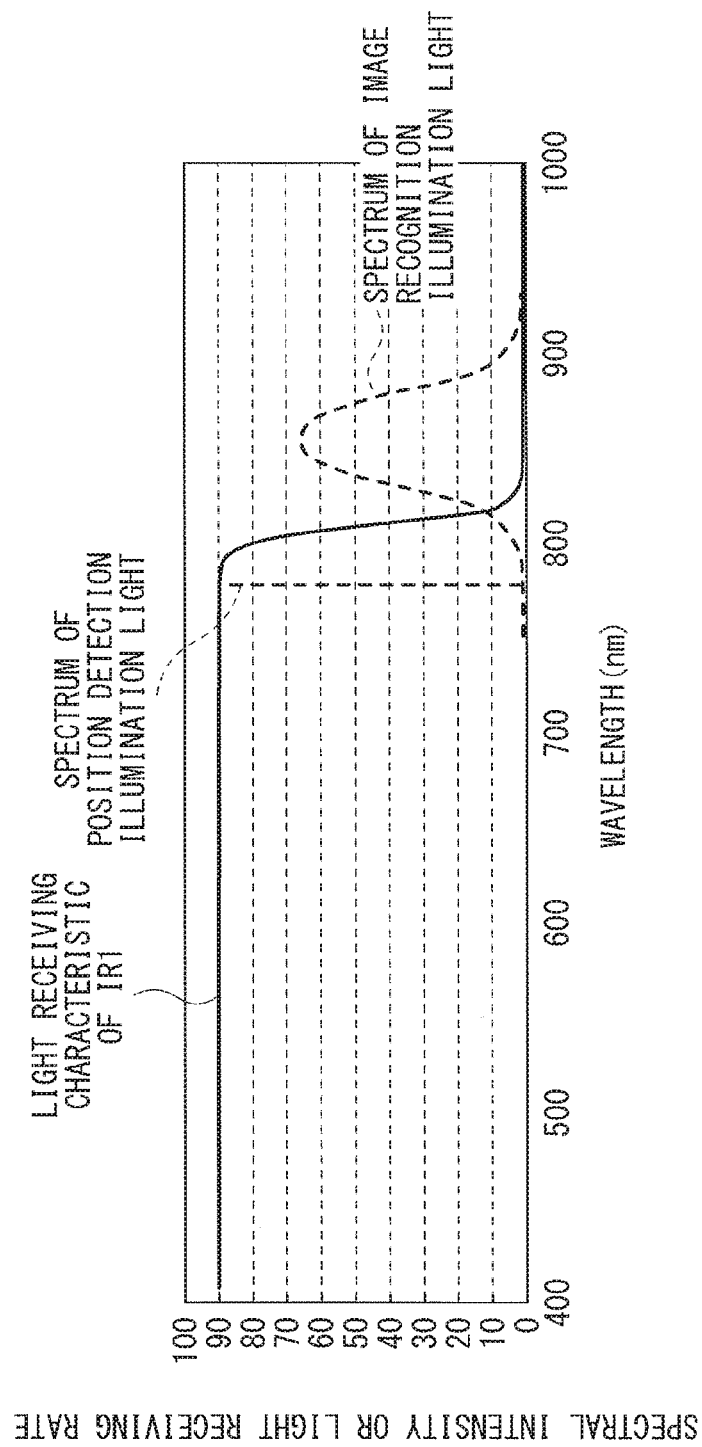
[FIG. 19]

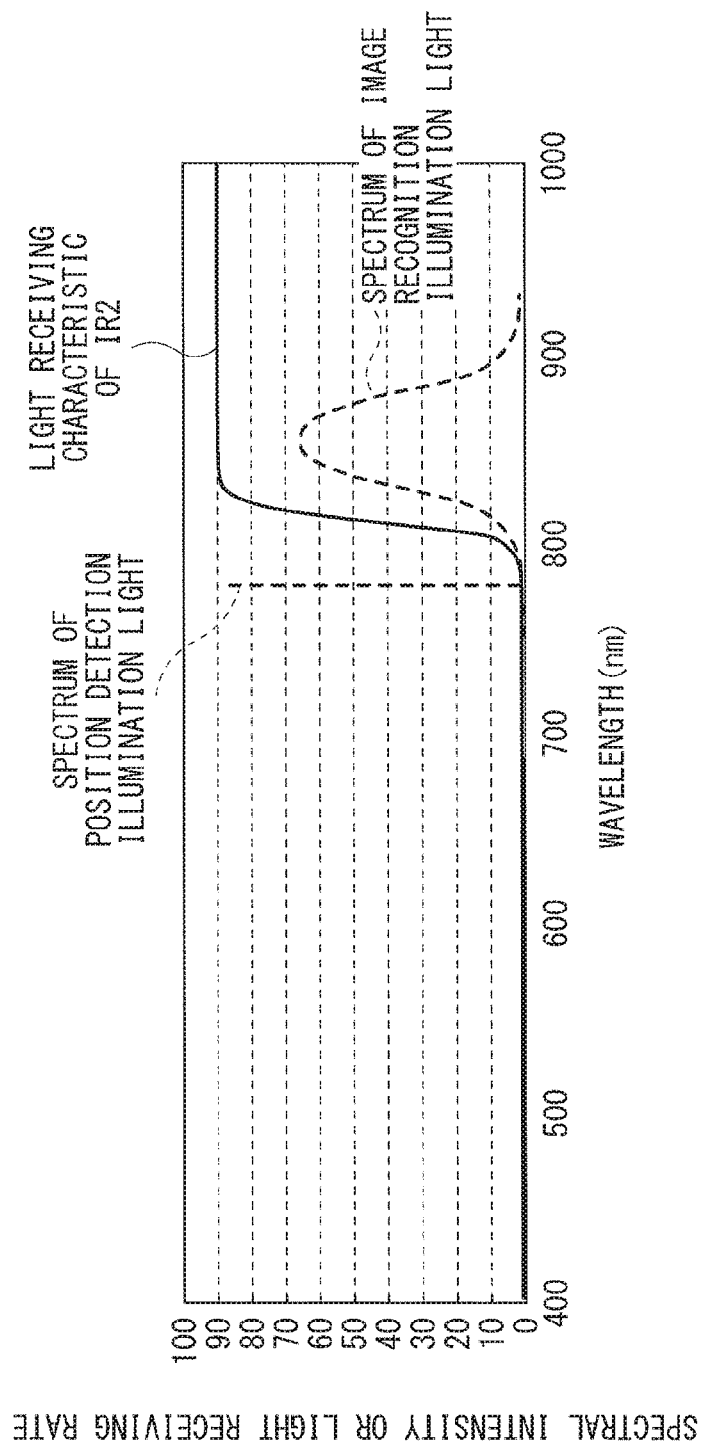
[FIG. 20]

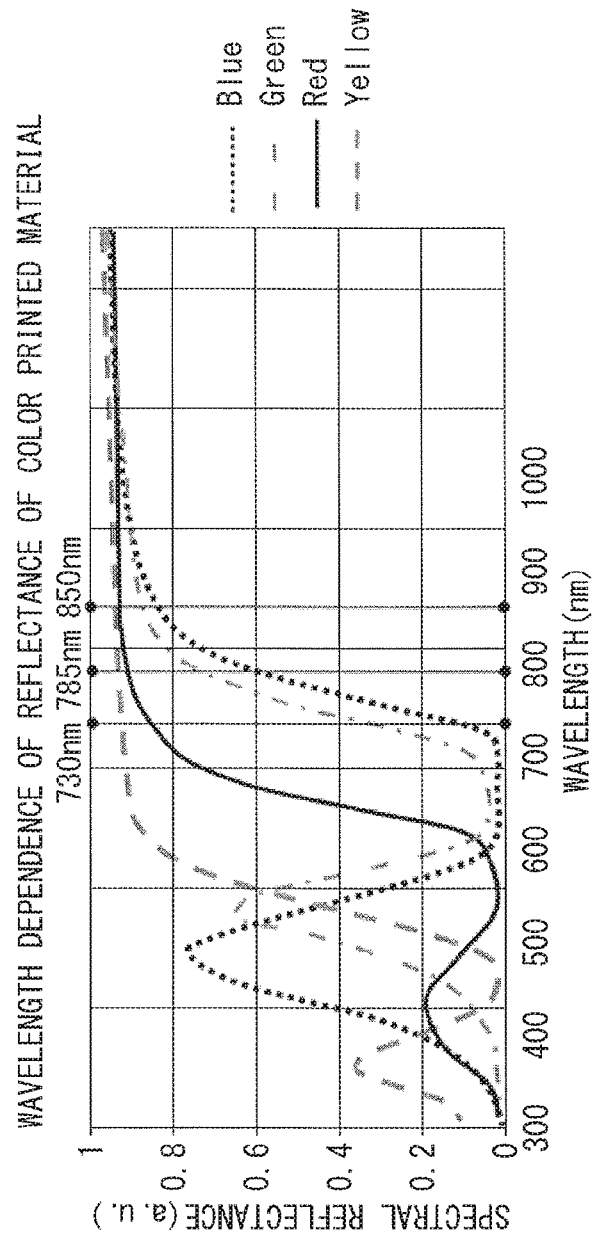

[ FIG. 22 ]
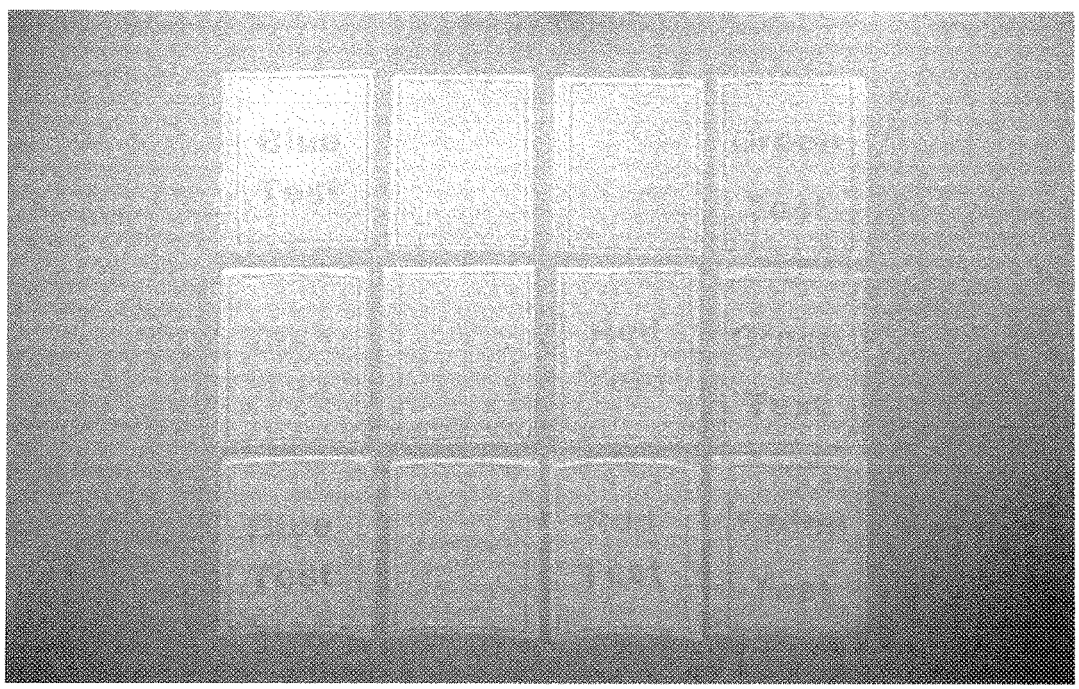

[ FIG. 23 ]
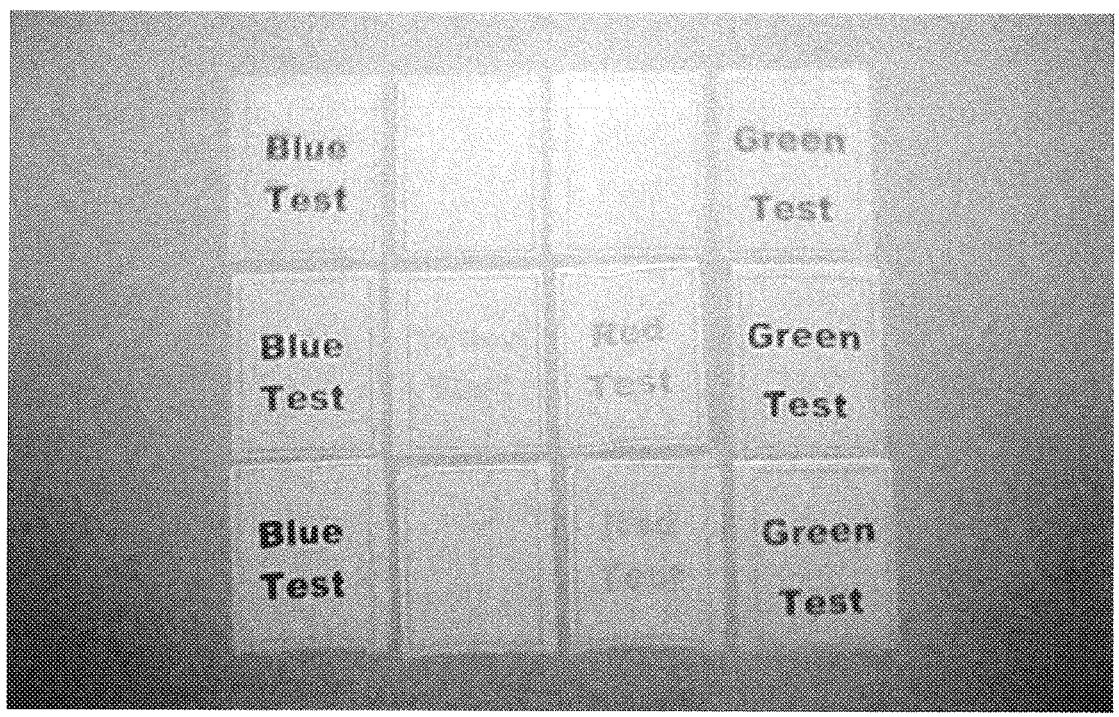

DISPLAY APPARATUS WITH DETECTION FUNCTION

CROSS REFERENCE TO RELATED APPLICATIONS

This application is a U.S. National Phase of International Patent Application No. PCT/JP2017/032263 filed on Sep. 7, 2017, which claims priority benefit of Japanese Patent Application No. JP 2016-178405 filed in the Japan Patent Office on Sep. 13, 2016. Each of the above-referenced applications is hereby incorporated herein by reference in its entirety.

TECHNICAL FIELD

The present disclosure relates to a display apparatus with detection function that has a function of projecting an image and a function of detecting an object.

BACKGROUND ART

In recent years, smartphones and tablets, etc. use a touch panel thereby allowing a pointing operation depending on one's intuition to scroll or zoom in and out an image displayed on a screen. Meanwhile, a display that displays an image by projecting the image onto a screen has been known as a projector since long ago.

CITATION LIST

Patent Literature

PTL 1: Japanese Unexamined Patent Application Publication No. 2015-64550

SUMMARY OF THE INVENTION

In recent years, a projector is also expected to allow a pointing operation of a projected image in a way depending on one's intuition, like a tablet terminal, etc., i.e., as if operating a touch panel by hand.

It is desirable to provide a display apparatus with detection function that is able to perform position detection and image recognition while projecting an image.

A display apparatus with detection function according to an embodiment of the present disclosure includes: a first illumination unit that outputs first illumination light; a light valve that generates image light by modulating the first illumination light on the basis of image data; a projection optical system that projects the image light onto a projection plane; a second illumination unit that outputs second illumination light used for position detection of a position detection object on the projection plane; a third illumination unit that outputs third illumination light used for image recognition of an image recognition object on the projection plane; an imaging unit where the second illumination light and the third illumination light enter through the projection optical system, and includes an imaging device disposed at an optically conjugate position with the light valve; and an image processing unit that performs position detection of the position detection object and image recognition of the image recognition object on the basis of a result of imaging by the imaging unit.

In the display apparatus with detection function according to the embodiment of the present disclosure, the image light generated on the basis of the first illumination light outputted from the first illumination unit is projected onto the projection plane. The second illumination light used for position detection of the position detection object on the projection plane is outputted from the second illumination unit. The third illumination light used for image recognition of the image recognition object on the projection plane is outputted from the third illumination unit.

The display apparatus with detection function according to the embodiment of the present disclosure includes the first illumination unit that outputs the first illumination light for image projection, the second illumination unit that outputs the second illumination light for position detection, and the third illumination unit that outputs the third illumination light for image recognition; therefore, it is possible to perform position detection and image recognition while projecting the image.

It is to be noted that the effects described here are not necessarily limited, and may be any effect described in the present disclosure.

BRIEF DESCRIPTION OF DRAWINGS

FIG. 1 is a configuration diagram schematically illustrating an example of a display apparatus with detection function according to a first embodiment of the present disclosure.

FIG. 2 is a block diagram schematically illustrating a functional configuration example of the display apparatus with detection function according to the first embodiment.

FIG. 3 is a configuration diagram schematically illustrating a configuration example of the display apparatus with detection function according to the first embodiment viewed from a lateral direction.

FIG. 4 is a configuration diagram schematically illustrating a configuration example of an imaging unit in the display apparatus with detection function according to the first embodiment.

FIG. 5 is a diagram that describes an example of spectra of pieces of illumination light and a transmission characteristic of a bandpass filter of the imaging unit in the display apparatus with detection function according to the first embodiment.

FIG. 6 is a diagram that describes an example of a result of imaging of an image recognition object.

FIG. 7 is a diagram that describes an example of a result of imaging of a position detection object.

FIG. 8 is a diagram that describes an example of a position detection signal.

FIG. 9 is a diagram that describes an example of a height of position detection illumination light.

FIG. 10 is a diagram that describes a first example of a method of switching between an image recognition mode and a position detection mode.

FIG. 11 is a diagram that describes a second example of a method of switching between the image recognition mode and the position detection mode.

FIG. 12 is a diagram that describes a third example of a method of switching between the image recognition mode and the position detection mode.

FIG. 13 is a diagram that describes a technique in which a position detection area is provided in a region outside a projection area.

FIG. 14 is a diagram that describes the technique in which the position detection area is provided in the region outside the projection area.

FIG. 15 is a configuration diagram schematically illustrating a configuration example of an imaging unit in a display apparatus with detection function according to a second embodiment.

FIG. 16 is a diagram that describes an example of spectra of pieces of illumination light and a transmission characteristic of a bandpass filter of an imaging unit in the display apparatus with detection function according to the second embodiment.

FIG. 17 is a diagram that describes an example of a reflection characteristic of an IR separation mirror in the display apparatus with detection function according to the second embodiment.

Figure 18:
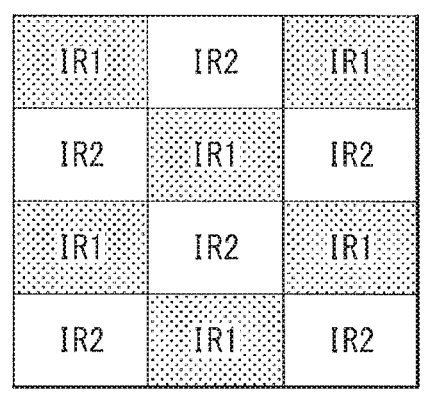

FIG. 18 is a diagram that describes an example of a light receiving pattern of an imaging device in a display apparatus with detection function according to a third embodiment.

FIG. 19 is a diagram that describes an example of spectra of pieces of illumination light and a light receiving characteristic of a first light receiving region of the imaging device in the display apparatus with detection function according to the third embodiment.

FIG. 20 is a diagram that describes an example of spectra of pieces of illumination light and a light receiving characteristic of a second light receiving region of the imaging device in the display apparatus with detection function according to the third embodiment.

FIG. 21 is a diagram that describes an example of wavelength dependence of reflectance of a color printed material.

FIG. 22 is a diagram that describes an example of an actual result of imaging of color printed materials in a case of use of illumination light of a wavelength of 785 nm.

FIG. 23 is a diagram that describes an example of an actual result of imaging of the color printed materials in a case of use of illumination light of a wavelength of 730 nm.

MODES FOR CARRYING OUT THE INVENTION

In the following, some embodiments of the present disclosure are described in detail with reference to the drawings. It is to be noted that description is made in the following order.
0. Comparative Example
1. First Embodiment (A display apparatus with detection function that performs position detection and image recognition with one imaging device by using two pieces of illumination light having substantially the same center wavelength)
   1.1 Configuration (FIGS. 1 to 5)
   1.2 Operation (FIGS. 6 to 12)
   1.3 Effects
   1.4 Modification Example (A display apparatus with detection function that is able to perform position detection from outside an image recognition area) (FIGS. 13 and 14)
2. Second Embodiment (A display apparatus with detection function that performs position detection and image recognition with two imaging devices by using two pieces of illumination light having different center wavelengths)
   2.1 Configuration and Operation (FIGS. 15 to 17)
   2.2 Effects
3. Third Embodiment (A display apparatus with detection function that performs position detection and image recognition with one imaging device by using two pieces of illumination light having different center wavelengths)
   3.1 Configuration and Operation (FIGS. 18 to 20)
   3.2 Effects
4. Fourth Embodiment (A display apparatus with detection function suitable for recognition of a color image)
   4.1 Configuration and Operation (FIGS. 21 and 22)
   4.2 Effects
5. Other Embodiments

0. COMPARATIVE EXAMPLE

In recent years, in the trading cards market, various kinds of cards are placed on the market by many companies. There are a lot of cards, for example, ones with a picture highly related to a game and ones with a picture representing an animation or cartoon character, etc.; such cards are very popular. In toy stores and game arcades, users insert a card like the one described above into a game machine, thereby being able to automatically play against the game machine. However, in a case of a game that users play one-on-one, normally, the users manually carry on the game by putting a card on a play mat in turns. To carry on the game, the users have to make a win-loss calculation on the play by themselves, which is cumbersome. Accordingly, there has been developed a game machine that is combined with a projector and a camera, thus making it possible to proceed with a game semi-automatically and make a win-loss calculation automatically. For example, this game machine causes the projector to project an image pertaining to a game, and causes the camera to recognize a picture or the like of a card, thereby reading card information and reflecting the card information in the progress of the game and the win-loss calculation.

(Problems)

In a game machine like the one described above, it is necessary to prepare a camera for reading a card separately from a projector, thus it is difficult to make the machine compact. Furthermore, as the camera is separate from the projector, there is a gap between a projected image and a recognized image captured by the camera, which may require calibration, such as a keystone correction and a position correction, of the captured recognized image.

Moreover, the projector has only an image projecting function; therefore, although users are able to have a Pull experience that is an image experience, the game machine does not have a Push function, such as pointing of an option or entry of information that is required to proceed with a game from the user side, thus is not an interactive machine.

Furthermore, as another example, in recent years, shops that sell and rent package media, such as CDs (compact discs) (registered trademark), DVDs (digital versatile discs) (registered trademark), and BDs (Blu-ray discs) (registered trademark), provide a service to play a piece of music or a promotional image relevant to a medium when the medium is put on a specific place. However, an operation to directly select the image or music is not possible for a user. It may be possible to perform a pseudo-operation of an image by operating a hard switch of a device provided separately in a different place from the image, an intuitive operation is difficult, unlike a case of operating an image by directly touching the image.

Meanwhile, for example, PTL 1 (Japanese Unexamined Patent Application Publication No. 2015-64550) proposes a projector with touch detection (position detection) function that allows a projected image to be operated in a manner like a touch panel.

To solve the above-described problems, it is desirable that a projector have a function of performing image recognition of an image recognition object, such as a card or a medium, on a projection plane, in addition to a touch detection (position detection) function. In this case, it is desirable to achieve an interactive projector that suppresses the occurrence of a position gap of the above-described recognized image and allows an intuitive operation of a projected image.

1. FIRST EMBODIMENT

1.1 Configuration

FIG. 1 schematically illustrates a configuration example of a display apparatus with detection function according to a first embodiment of the present disclosure. FIG. 2 schematically illustrates a functional configuration example of the display apparatus with detection function. FIG. 3 schematically illustrates a configuration example of the display apparatus with detection function viewed from a lateral direction. FIG. 4 schematically illustrates a configuration example of an imaging unit 5 in the display apparatus with detection function. FIG. 5 illustrates an example of spectra of multiple pieces of illumination light used in the display apparatus with detection function and a transmission characteristic of a bandpass filter 52 of the imaging unit 5.

The display apparatus with detection function according to the present embodiment has a function as a projector that projects an image onto a projection plane 30, a touch detection (position detection) function that detects a position or motion of a position detection object 71, for example, one's finger or the like on the projection plane 30, and a function of image recognition of an image recognition object 72, such as a card or a medium, on the projection plane 30.

It is to be noted that the projection plane 30 may be a screen for projection. Furthermore, the projection plane 30 may be a surface of a desk and a floor surface, etc. Moreover, the projection plane 30 may be a wall surface, etc.

As illustrated in FIGS. 1 and 2, the display apparatus with detection function according to the present embodiment includes an image projection illumination unit 1, a position detection illumination unit 2, an image recognition illumination unit 3, a projection optical system 4, the imaging unit 5, a detected-image processing unit 6, an illumination control unit 7, and a display control unit 8. The display apparatus with detection function according to the present embodiment further includes a light valve 21 and a polarization separation device 23.

The image projection illumination unit 1 is a first illumination unit that outputs image projection illumination light 41 as first illumination light. The light valve 21 is illuminated with the image projection illumination light 41 outputted from the image projection illumination unit 1 through the polarization separation device 23.

As illustrated in FIG. 4, the image projection illumination unit 1 includes an illumination optical system 10 and a light source unit 11. For example, as illustrated in FIG. 5, the light source unit 11 has laser light sources that emit pieces of light having red (R), green (G), and blue (B) spectra. The light source unit 11 has, for example, a blue laser 11B that emits B light, a green laser 11G that emits G light, and a red laser 11R that emits R light. The light emission from each of the red laser 11R, the green laser 11G, and the blue laser 11B may be controlled, for example, in accordance with a field sequential method by a not-illustrated emission control unit.

The illumination optical system 10 generates the image projection illumination light 41 having R, G, and B spectra on the basis of light from the light source unit 11. The illumination optical system 10 may include a condenser lens that concentrates pieces of color light from the light source unit 11, a light uniformizing member that uniformizes the pieces of color light, a light-path synthesizing member that synthesizes respective color light paths, etc.

The light valve 21 generates image light 44 by modulating the image projection illumination light 41 on the basis of image data supplied from the display control unit 8. The light valve 21 is a reflective liquid crystal device, for example, liquid crystal on silicon (LCOS) or the like. The image light 44 generated by the light valve 21 is projected onto the projection plane 30 through the polarization separation device 23 and the projection optical system 4.

The position detection illumination unit 2 is a second illumination unit that outputs position detection illumination light 42 as second illumination light used for position detection of the position detection object 71 on the projection plane 30. The position detection illumination unit 2 is provided, for example, at the lower part of a main body 100. The position detection illumination unit 2 outputs the position detection illumination light 42 so that at least a projection area 31 of the image light 44 on the projection plane 30 is surrounded by the position detection illumination light 42 from a predetermined height.

The image recognition illumination unit 3 is a third illumination unit that outputs image recognition illumination light 43 as third illumination light used for image recognition of the image recognition object 72 on the projection plane 30. The image recognition illumination unit 3 illuminates at least a region including the projection area 31 of the image light 44 on the projection plane 30 with the image recognition illumination light 43.

As illustrated in FIG. 5, respective wavelength bands of the position detection illumination light 42 and the image recognition illumination light 43 are different from a wavelength band of the image projection illumination light 41, and a center wavelength of the position detection illumination light 42 and a center wavelength of the image recognition illumination light 43 are substantially the same each other.

As illustrated in FIG. 5, the wavelength band of the image projection illumination light 41 is a visible range, and the wavelength bands of the position detection illumination light 42 and the image recognition illumination light 43 are a near-infrared range. The position detection illumination unit 2 and the image recognition illumination unit 3 each include a near-infrared light source. The wavelength band of the image recognition illumination light 43 is desirably wider than the wavelength band of the position detection illumination light 42.

The detected-image processing unit 6 is an image processing unit that performs position detection of the position detection object 71 and image recognition of the image recognition object 72 on the basis of a result of imaging by the imaging unit 5. For example, the detected-image processing unit 6 analyzes a detection signal from the imaging unit 5, and acquires position data (coordinate data) of a detected object. The detected-image processing unit 6 may have a function of analyzing not only the position of the position detection object 71 but also a motion, such as a gesture motion, of the position detection object 71.

The image data supplied from the display control unit 8 may include image data including information relevant to an image of the image recognition object 72 recognized by the detected-image processing unit 6.

The illumination control unit 7 performs control of switching between on (output) and off (non-output) of the position detection illumination light 42 from the position detection illumination unit 2 and control of switching between on (output) and off (non-output) of the image recognition illumination light 43 from the image recognition illumination unit 3.

When in a position detection mode in which the detected-image processing unit 6 performs position detection of the position detection object 71, the illumination control unit 7 controls the position detection illumination unit 2 and the image recognition illumination unit 3 so that, of the position detection illumination light 42 and the image recognition illumination light 43, only the position detection illumination light 42 is outputted. Furthermore, when in an image recognition mode in which the detected-image processing unit 6 performs image recognition of the image recognition object 72, the illumination control unit 7 controls the position detection illumination unit 2 and the image recognition illumination unit 3 so that, of the position detection illumination light 42 and the image recognition illumination light 43, at least the image recognition illumination light 43 is outputted.

The projection optical system 4 includes a projection lens 24 as illustrated in FIG. 2. The projection lens 24 may be an ultra-short focus lens. The projection optical system 4 has a function as an image-forming optical system for position detection and image recognition, in addition to the function of projecting an image. The image light 44 generated by the light valve 21 enters the projection optical system 4, and also the projection optical system 4 takes in the image recognition illumination light 43 and scattered light La of the position detection illumination light 42 caused by the position detection object 71 from the side of the projection plane 30.

The imaging unit 5 includes an imaging device 22 and an imaging optical system 25.

The imaging device 22 includes a solid-state image sensing device, such as a CMOS (complementary metal-oxide semiconductor) or a CCD (charge coupled device). The imaging device 22 is disposed at an optically conjugate position with the projection plane 30. Furthermore, the imaging device 22 is disposed at an optically conjugate position with the light valve 21. More specifically, in a case where the light valve 21 is a reflective liquid crystal device, the light valve 21 is disposed so that a display surface (a liquid crystal surface) that creates an image is at an optically conjugate position with an imaging surface of the imaging device 22. The scattered light La of the position detection illumination light 42 and the image recognition illumination light 43 enter the imaging device 22 through the projection optical system 4 and the polarization separation device 23. The imaging device 22 is able to perform imaging of at least an imaging area that is substantially the same area as the projection area 31 on the projection plane 30.

The imaging optical system 25 is disposed between an optically conjugate plane 50 of the light valve 21 and the imaging device 22. For example, as illustrated in FIG. 4, the imaging optical system 25 includes a reduction optical system 51 including a plurality of relay lenses 53 and the bandpass filter 52.

By providing the reduction optical system 51 including the relay lenses 53, it becomes possible to set the optically conjugate position with the light valve 21 farther than the conjugate plane 50. Furthermore, by providing the reduction optical system 51, it becomes possible to make the size of the imaging device 22 smaller than the light valve 21 while the imaging device 22 is disposed at the optically conjugate position with the light valve 21.

The bandpass filter 52 is provided to separate the image projection illumination light 41 from the position detection illumination light 42 and the image recognition illumination light 43. For example, as illustrated in FIG. 5, the bandpass filter 52 has a transmission characteristic of suppressing the image projection illumination light 41 and allowing respective center wavelengths of the position detection illumination light 42 and the image recognition illumination light 43 to be transmitted therethrough.

Since light that is image-formed on the imaging device 22 is weak, it is important to insert the bandpass filter 52 for the purpose of preventing saturation of a signal at the time of image recognition and position detection. By setting the characteristic of the bandpass filter 52 to a characteristic of allowing a near-infrared region to be transmitted therethrough and suppressing visible light and infrared light other than near-infrared light, it becomes possible to achieve both the function as a projector and the function of position detection and image recognition. By causing the bandpass filter 52 to suppress unnecessary light at the time of position detection and image recognition, it becomes possible to lead position detection light (the scattered light La of the position detection illumination light 42) and image recognition light (the image recognition illumination light 43) as signal light onto the imaging device 22. Accordingly, it becomes possible to obtain clear image information with an appropriate S/N ratio on the imaging device 22. With the condition of this characteristic, as described above, it is desirable that the center wavelengths of the position detection illumination light 42 and the image recognition illumination light 43 be substantially the same wavelength band.

For example, as illustrated in FIG. 4, the polarization separation device 23 is a polarized beam splitter having four optical surfaces. Here, two surfaces horizontally facing each other in FIG. 4 are referred to as first and third optical surfaces, and two surfaces vertically facing each other are referred to as second and fourth optical surfaces. As illustrated in FIG. 4, the image projection illumination light 41 from the image projection illumination unit 1 enters the first optical surface. The light valve 21 is disposed on the side of the second optical surface of the polarization separation device 23. The imaging unit 5 is disposed on the side of the third optical surface of the polarization separation device 23. The projection optical system 4 is disposed on the side of the fourth optical surface of the polarization separation device 23.

The polarization separation device 23 separates incident light into a first polarized component (for example, an S-polarized component) and a second polarized component (for example, a P-polarized component), and outputs the first and second polarized components in different directions from each other. The polarization separation device 23 selectively reflects a specific first polarized component, and selectively allows a specific second polarized component to be transmitted therethrough. The polarization separation device 23 reflects a first polarized component included in the image projection illumination light 41 that has entered the first optical surface toward the light valve 21. Light that has been modulated by the light valve 21 and separated into a second polarized component is outputted from the fourth optical surface of the polarization separation device 23 and, as the image light 44, enters the projection optical system 4.

Furthermore, the scattered light La of the position detection illumination light 42 and the image recognition illumination light 43 enter the fourth optical surface of the polarization separation device 23 through the projection optical system 4. The polarization separation device 23 reflects respective first polarized components included in the scattered light La of the position detection illumination light 42 and the image recognition illumination light 43 toward the imaging unit 5 through the third optical surface.

1.2 Operation (With Regard to Image Recognition)

FIG. 6 illustrates an example of a result of imaging of the image recognition object 72 by the imaging unit 5.

The example illustrated in FIG. 6 is a result of imaging of the image recognition object 72 in a case of the image recognition mode through projection of the image light 44. The image recognition mode here is a state in which the image recognition illumination is on, and the position detection illumination is off.

The above-described configuration makes it possible for the imaging device 22 to image information of the image recognition object 72 disposed in the projection area 31 as information of luminance when illuminated with the image recognition illumination light 43 as illustrated in FIG. 6 without being affected by image information of the image light 44 projected onto the projection plane 30. The detected-image processing unit 6 performs image processing on a detection signal from the imaging device 22, and performs individual recognition of the image recognition object 72. In a case where the image recognition object 72 is a card or a CD, etc., the detected-image processing unit 6 performs individual recognition of the image recognition object 72 by recognizing a feature point, such as a picture printed on its surface. The detected-image processing unit 6 feeds back information relevant to the recognized image recognition object 72 to the display control unit 8. The display control unit 8 supplies the light valve 21 with image data including the information relevant to the recognized image recognition object 72. Accordingly, it is possible to project the information relevant to the recognized image recognition object 72 as an image.

FIG. 6 is a raw image of the image recognition object 72 imaged by the imaging device 22. As seen from FIG. 6, there is little trapezoidal distortion or position gap in the image imaged by the imaging device 22. As described in Comparative Example provided above, in a case of an image imaged by a camera as a separate body, a position gap is likely to occur, and it differs in the projection style (the imaging style) from the display apparatus with detection function according to the present embodiment, thus trapezoidal distortion easily occurs due to divergence of an angle of view of the camera or divergence of an image relationship with an object. In the configuration of the display apparatus with detection function according to the present embodiment, the projection optical system 4 is disposed on a light path from the image recognition object 72 to the imaging device 22, and an optical system for image recognition is partially shared with an optical system for image projection. Accordingly, the occurrence of trapezoidal distortion or a position gap is suppressed. To suppress the occurrence of trapezoidal distortion or a position gap, an ultra-short focus projection lens 24 is desirably used in the projection optical system 4.

(With Regard to Position Detection)

FIG. 7 illustrates an example of a result of imaging of the position detection object 71 by the imaging unit 5. FIG. 8 illustrates an example of a detection signal based on a result of imaging by the imaging device 22. The example illustrated in FIG. 7 is a result of imaging of the position detection object 71 in a case of the position detection mode through projection of the image light 44. The position detection mode here is a state in which the image recognition illumination is off, and the position detection illumination is on.

The display apparatus with detection function according to the present embodiment has the function of not only image recognition but also position detection, and makes it possible to achieve a touch interaction function in accordance with an intuitive operation on a tablet terminal or the like. This enables a user to perform a more spontaneous operation and have an image experience intended by an image provider side.

As illustrated in FIGS. 1 and 3, the position detection illumination unit 2 outputs the position detection illumination light 42 from the lower part of the main body 100; the position detection illumination light 42 is diffused over a wide angle so that at least the projection area 31 of the image light 44 on the projection plane 30 is surrounded by the position detection illumination light 42 from a predetermined height. Accordingly, at least the projection area 31 on the projection plane 30 is surrounded by a near-infrared light barrier formed by the position detection illumination light 42 from the predetermined height. By surrounding with such a near-infrared light barrier, the position detection illumination light 42 does not diffuse in a case where there is no pointing of the position detection object 71, such as the finger. Meanwhile, in a case where the projection area 31 is pointed by the finger or the like, the finger or the like blocks the near-infrared light barrier, and scattered light La is generated by the position detection illumination light 42 hitting the finger or the like. This scattered light La of the position detection illumination light 42 enters the imaging device 22 through the projection optical system 4 and the polarization separation device 23, as with the case of image recognition described above. Here, the imaging device 22 and the projection plane 30 are disposed in positions where they bear an optically conjugate relationship; therefore, an image projection position and a position pointed by the finger or the like are in a 1:1 relationship. Accordingly, the detected-image processing unit 6 analyzes a detection signal based on a result of imaging by the imaging device 22, thereby makes it possible to identify a position (coordinates) pointed by the finger or the like, on the projection plane 30. The detected-image processing unit 6 feeds back the identified position information to the display control unit 8, thereby reflects the position information in image data to be projected. This makes it possible for a user to operate an image with the user's finger or the like as a role of sort of a pointer of a mouse.

In a case where the detected-image processing unit 6 identifies a position pointed by the finger or the like, for example, as illustrated in FIG. 8, by setting an appropriate threshold and binarizing a detection signal, it becomes possible to extract a position signal separated from a noise component. However, in the present embodiment, respective center wavelengths of the position detection illumination light 42 and the image recognition illumination light 43 are substantially the same; therefore, if the projection plane 30 is illuminated with the image recognition illumination light 43, the noise level becomes very high, and it becomes difficult to extract the position signal. Therefore, in the present embodiment, in the position detection mode, it is desirable to turn off the image recognition illumination light 43 at appropriate timing.

(With Regard to Switching Between Image Recognition Mode and Position Detection Mode)

FIG. 10 illustrates a first example of a method of switching between the image recognition mode and the position detection mode.

The illumination control unit 7 and the detected-image processing unit 6 may perform switching between the image recognition mode and the position detection mode, for example, on the basis of a change of an image content to be projected onto the projection plane 30. For example, in a case where the image content is an image pertaining to a game, the illumination control unit 7 and the detected-image processing unit 6 may perform switching between the image recognition mode and the position detection mode on the basis of progress of the game.

For example, in a situation where a game goes on in the image recognition mode, when it comes to a specific situation under a scenario of the game in progress, the illumination control unit 7 and the detected-image processing unit 6 may make a transition from the image recognition mode to the position detection mode. In this case, the display control unit 8 may display a touch menu suitable for touch detection. In a case where the detected-image processing unit 6 has detected that a user has selected a certain menu while the touch menu is displayed, the illumination control unit 7 and the detected-image processing unit 6 may make a transition from the position detection mode to the image recognition mode.

Accordingly, in a case where the display apparatus with detection function according to the present embodiment is applied to a card game machine, for example, it is possible to perform switching between the position detection mode and the image recognition mode on the game application side when a game goes on. For example, during play at cards, the image recognition illumination is turned on, and a card recognition mode (the image recognition mode) is set. Furthermore, for example, in a case where a user has to select some menu to carry on the game, the image recognition illumination is turned off, and the position detection illumination is turned on, thereby it becomes possible to operate the projection plane 30 in a manner like a touch panel.

FIG. 11 illustrates a second example of a method of switching between the image recognition mode and the position detection mode.

For example, in a case where when in the image recognition mode, the detected-image processing unit 6 has recognized that an image recognition object 72A with a predetermined design as illustrated in FIG. 11 has been disposed in a specific position on the projection plane 30, the illumination control unit 7 and the detected-image processing unit 6 may make a transition to the position detection mode.

FIG. 12 illustrates a third example of a method of switching between the image recognition mode and the position detection mode.

For example, in a case where when in the image recognition mode, the detected-image processing unit 6 has recognized a predetermined graphic pattern at several points on the projection plane 30 at the same time, the illumination control unit 7 and the detected-image processing unit 6 may make a transition to the position detection mode. FIG. 12 illustrates an example where image recognition objects 73A and 73B each with a predetermined graphic pattern that prompts a transition to the position detection mode have been disposed at two specific positions on the projection plane 30. The predetermined graphic pattern may be a pattern of a specific form of a hand, for example, as in the example of FIG. 12.

Besides the above-described examples, another switching method is also possible. For example, in a case where the display apparatus with detection function according to the present embodiment is applied to a system that provides information relevant to a medium when the medium is put on a specific place for trial listening in shops that sell and rent package media, for example, CDs, DVDs, etc., the image recognition mode may be set first. Then, in a state of the image recognition mode, when the system has recognized that a medium has been set on the projection plane 30 of an image and has recognized information, etc. shown on a surface of the medium, the system may make a transition to the position detection mode and display a user-selectable menu. This allows for a screen operation in accordance with a user's intuition depending on the medium in such a way that the user touches the screen to select a piece of music that the user wants to listen or to seek a part of a video that the user wants to watch.

(Relationship Between the Height of Position Detection Illumination Light 42 and the Height of the Image Recognition Object 72)

FIG. 9 illustrates an example of the height of the position detection illumination light 42 with respect to the projection plane 30.

As described above, the position detection illumination unit 2 outputs the position detection illumination light 42 from the predetermined height with respect to the projection plane 30. In this case, it is desirable that the position detection illumination unit 2 output, as the position detection illumination light 42, light substantially parallel to the projection plane 30 from a position higher than a height of a predetermined number of the image recognition objects 72 stacked on top of another on the projection plane 30.

As described above, in a case of detecting the position detection object 71, such as the finger, the display apparatus with detection function according to the present embodiment detects scattered light La generated in a case where the near-infrared light barrier formed by the position detection illumination light 42 is blocked by the finger or the like. Therefore, in a case where the finger or the like does not point near the projection plane 30, it is desirable to set a state where the scattered light La is not generated. Accordingly, if the height of the position detection illumination light 42 with respect to the projection plane 30 is too low, the scattered light La is generated due to the image recognition object 72 disposed on the projection plane 30; therefore, it is desirable to output the position detection illumination light 42 from a height that does not allow generation of the scattered light La due to the image recognition object 72.

It is to be noted that the above-described predetermined number is desirably set to a number depending on an assumed image recognition object 72. For example, in a case where the apparatus according to the present embodiment is applied to a card game, the image recognition object 72 is a card; however, in that case, a plurality of cards may be used in a stacked form. In this case, the predetermined number may be more than one. Furthermore, in a case where the image recognition object 72 is a package medium, such as a CD or a DVD, normally, media are not used in a stacked form. In this case, the predetermined number may be one.

(With Regard to a Diffusion Angle of the Image Recognition Illumination Light 43)

An output diffusion angle θ2 of the image recognition illumination light 43 is desirably greater than an output diffusion angle θ1 of the position detection illumination light 42 as illustrated in FIG. 3. Furthermore, the output diffusion angle θ2 of the image recognition illumination light 43 is desirably ten times or more as large as the output diffusion angle θ1 of the position detection illumination light 42. It is to be noted that the output diffusion angles θ1 and θ2 referred to herein are each a diffusion angle in a direction vertical to the projection plane 30.

For example, the output diffusion angle θ1 of the position detection illumination light 42 may be 2° or less. Furthermore, the output diffusion angle θ2 of the image recognition illumination light 43 may be 30° or more, although it depends on the size of the projection area 31.

(Output Positions of Pieces of Illumination Light)

An output position P3 of the image recognition illumination light 43 in the image recognition illumination unit 3 is desirably farther from the projection plane 30 than an output position P2 of the position detection illumination light 42 in the position detection illumination unit 2, as illustrated in FIG. 3.

Furthermore, an output position P1 of the image light 44 in the projection optical system 4 is desirably farther from the projection plane 30 than the output position P2 of the position detection illumination light 42 in the position detection illumination unit 2, as illustrated in FIG. 3. Moreover, the output position P3 of the image recognition illumination light 43 in the image recognition illumination unit 3 is desirably farther from the projection plane 30 than the output position P1 of the image light 44 in the projection optical system 4 is as illustrated in FIG. 3.

1.3 Effects

As described above, according to the present embodiment, the image projection illumination unit 1 that outputs the image projection illumination light 41, the position detection illumination unit 2 that outputs the position detection illumination light 42, and the image recognition illumination unit 3 that outputs the image recognition illumination light 43 are provided; therefore, it is possible to perform touch detection (position detection) and image recognition while projecting an image. Accordingly, the occurrence of a position gap of a recognized image is suppressed, and the projected image is made intuitively operable, and then it is possible to achieve an interactive display.

It is to be noted that the effects described in this specification are merely an example and non-limiting, and there may also be other effects. The same applies to effects of the following other embodiments.

1.4 Modification Example

The above-described first embodiment provides an example where the image recognition and the position detection are performed within substantially the same area as the projection area 31 of the image; however, an image recognition area or a position detection area may be provided in a region outside the projection area 31, besides the projection area 31 of the image. In this case, the image recognition area or the position detection area provided in the region outside the projection area 31 may be used for switching between the image recognition mode and the position detection mode.

For example, in the image recognition mode, the interior of substantially the same area as the projection area 31 of the image may be set as the image recognition area, and the position detection area may be provided in a region outside the projection area 31. In this case, in the image recognition mode, both the image recognition illumination and the position detection illumination are turned on. Then, for example, in a case where detection of a predetermined motion that prompts a transition to the position detection mode is performed in the position detection area, it may be set to make a transition to the position detection mode. The predetermined motion here may be, for example, a motion of quickly tapping about the same position twice with the finger or the like, namely, a double-tap. In the position detection mode, at least the interior of substantially the same area as the projection area 31 of an image may be set as the position detection area. In this case, in the position detection mode, it is desirable that the image recognition illumination be turned off, and the position detection illumination be turned on. Furthermore, in the position detection mode, a menu that prompts a transition from the position detection mode to the image recognition mode may be projected and displayed on the projection area 31, and in a case where a selection of the menu has been made, it may be set to make a transition to the image recognition mode.

To perform the above-described switching operation, for example, in the image recognition mode, the detected-image processing unit 6 may perform image recognition of the image recognition object 72 within a predetermined region (for example, within substantially the same area as the projection area 31) on the projection plane 30 and detection of the predetermined motion of the position detection object 71 outside the predetermined region (for example, a region outside the projection area 31) on the projection plane 30. In the position detection mode, the detected-image processing unit 6 may perform position detection of the position detection object 71 at least within the predetermined region (for example, within substantially the same area as the projection area 31).

Furthermore, to perform the above-described switching operation, in the image recognition mode, the illumination control unit 7 may control the position detection illumination unit 2 and the image recognition illumination unit 3 so as to cause them to output both the position detection illumination light 42 and the image recognition illumination light 43. Moreover, in the image recognition mode, the illumination control unit 7 may make a transition to the position detection mode in a case where it has been detected that the detected-image processing unit 6 has detected the predetermined motion outside the predetermined region.

(Technique in which the Position Detection Area is Provided in a Region Outside the Projection Area 31)

A technique in which the position detection area is provided in a region outside the projection area 31 is described with reference to FIGS. 13 and 14.

FIGS. 13 and 14 illustrate an example where multiple channel regions CH1, CH2, CH3, and CH4 as the position detection areas are provided in regions outside the projection area 31.

FIG. 13 illustrates an example of a position relationship among an image circle C1, a surface shape (a rectangular shape A1) corresponding to an effective area of the light valve 21, a surface shape (a rectangular shape A3) corresponding to an effective area of the imaging device 22, and the channel regions CH1, CH2, CH3, and CH4. The rectangular shapes A1 and A3 specifically correspond to a surface shape in a position of substantially a focal length of the projection lens 24. In general, an "image circle" indicates a circular range on which light that has passed through a lens is focused. A projection system, such as a projector, is designed so that an effective area of the light valve 21 is secured in a position where the light valve 21 is disposed. That is, it is designed so that a passage region of a light beam outputted from the effective area of the light valve 21 is secured in the projection lens 24. Meanwhile, in a case of an imaging system such as a camera, it is designed so that a passage region of a light beam that enters the effective area of the imaging device 22 is secured in an imaging lens. In the present embodiment, projection of an image and capturing of detection light (near-infrared light) are performed with one projection lens 24; therefore, the image circle C1 is desirably set so that a light beam passing through a portion of the highest image height is secured.

In a case where the projection lens 24 is an ultra-short focus lens, the image circle C1 is designed so that a passage region of a light beam of which the image height is largely shifted (offset) along one direction (a Y direction in FIG. 13) is secured. Here, in a case of a projector that only projects an image, an image circle C100 is designed so as to be circumscribed to some vertices of the rectangular shape A1 of the light valve 21. Specifically, the image circle C100 is designed so as to be in contact with a pair of vertices A11 and A12 sharing one long side of the rectangular shape A1. Designing the image circle C100 so as to be circumscribed to the rectangular shape A1 is to minimize the diameter in terms of the maintenance of characteristics and the cost because the diameter itself of the image circle C100 is very large, and the size of the projection lens 24 is huge.

Incidentally, in the present embodiment, the projection plane 30 is irradiated with the position detection illumination light 42 from a predetermined height; therefore, there is a difference corresponding to the predetermined height between an actual detection position of the position detection object 71 and the position on the projection plane 30. The image circle C1 is desirably designed in consideration of this difference. Specifically, it is advantageous for the image circle C1 to contain a rectangular shape A2 including a cover area A2a for which the difference has been taken into consideration. This is because this makes it possible to detect an object also in a corner (a vertex portion) of the projection area 31.

To secure the position detection area in a peripheral part of the projection area 31, the rectangular shape A3 of the imaging device 22 is designed to have a bigger size than the rectangular shape A1 of the light valve 21. In other words, a diagonal size of the imaging device 22 is configured to meet the following conditional expression (1), where d1 denotes a diagonal size of the light valve 21; d2 denotes the diagonal size of the imaging device 22; β denotes optical magnification of the imaging optical system 25 (in a case of a reduction optical system, β>1; in a case of an enlargement optical system, β<1; in a case of an equal-magnification optical system, β=1). However, in the present embodiment, the imaging optical system 25 includes the reduction optical system 51; therefore, β is a reduction magnification, and thus β>1. It is to be noted that the diagonal size d1 is a diagonal size of the effective area of the light valve 21, and the diagonal size d2 is a diagonal size of the effective area of the imaging device 22. This makes it possible to allocate the channel regions CH1 to CH4 for out-of-area detection to the periphery of the rectangular shape A1 of the light valve 21. In other words, the image circle C1 has an unoccupied region around the rectangular shapes A1 and A2, and it is possible to allocate the channel regions CH1 to CH4 to this unoccupied region. Furthermore, vertices A31 and A32 of the rectangular shape A3 of the imaging device 22 may be configured to be in contact with the image circle C1, or the vertices A31 and A32 of the rectangular shape A3 may be configured to protrude from the outer circumference of the image circle C1.

$$d1 < \beta \times d2 \tag{1}$$

The channel regions CH1 to CH4 are provided, for example, facing respective sides of the rectangular shape A1, and are each a rectangular region having a longitudinal direction along the outer perimeter of the rectangular shape A1. However, this layout is just an example. As long as the channel regions CH1 to CH4 are allocated to regions that are outside the outer perimeter of the rectangular shape A1 and inside the outer circumference of the image circle C1, the number, shapes, and positions of the channel regions are not particularly limited. Furthermore, multiple channel regions may be allocated to one side of the rectangular shape A1 to increase functions of an execution object. Alternatively, to the contrary, only one channel region may be provided on the periphery of the rectangular shape A1. Here is described an example where the channel regions CH1 to CH4 are allocated facing four sides of the rectangular shape A1, respectively.

FIG. 14 illustrates an example of layout on the projection plane 30 based on such channel setting. In this way, the channel regions CH1, CH2, CH3, and CH4 are formed around the projection area 31, for example. In a case where these channel regions CH1, CH2, CH3, and CH4 are assumed to be operated with the finger or the like, the width b is desirably 10 mm or more. Furthermore, the width b is more desirably 30 mm or more, and yet more desirably 50 mm or more. It is to be noted that this example illustrates a case where the projection area 31 is full-screen display (full-size display).

The other configurations, operations, and effects may be substantially similar to those of the display apparatus with detection function according to the first embodiment.

2. SECOND EMBODIMENT

Next, a display apparatus with detection function according to a second embodiment of the present disclosure is described. It is to be noted that in the following, substantially the same component as that of the display apparatus with detection function according to the first embodiment is assigned the same reference numeral, and description of the component is omitted accordingly.

2.1 Configuration and Operation

In the first embodiment, there is provided an example where respective center wavelengths of the position detection illumination light 42 and the image recognition illumination light 43 are substantially the same, and the image recognition mode and the position detection mode are temporally switched. In contrast, in the present embodiment, the center wavelengths of the position detection illumination light 42 and the image recognition illumination light 43 are different wavelengths from each other, and it is intended to provide a display apparatus with detection function that is able to perform image recognition and position detection temporally at the same time.

FIG. 15 schematically illustrates a configuration example of an imaging unit 5A in the display apparatus with detection function according to the second embodiment of the present disclosure. FIG. 16 illustrates an example of spectra of pieces of illumination light and a transmission characteristic of a wideband bandpass filter 52A of the imaging unit 5A in the display apparatus with detection function according to the second embodiment. FIG. 17 illustrates an example of a reflection characteristic of an IR separation mirror 54 in the display apparatus with detection function according to the second embodiment.

The display apparatus with detection function according to the present embodiment includes the imaging unit 5A instead of the imaging unit 5 (FIG. 4) in the display apparatus with detection function according to the first embodiment.

The imaging unit 5A includes, instead of the imaging device 22 in the above-described first embodiment, a first imaging device 22A that the position detection illumination light 42 enters and a second imaging device 22B that the image recognition illumination light 43 enters.

Furthermore, the imaging unit 5A includes an imaging optical system 25A instead of the imaging optical system 25 in the first embodiment.

The first and second imaging devices 22A and 22B are each disposed at an optically conjugate position with the light valve 21 through the polarization separation device 23 and the imaging optical system 25A. The first and second imaging devices 22A and 22B each output a result of imaging to the detected-image processing unit 6. The detected-image processing unit 6 analyzes the respective results of imaging, and performs detection of a position of the position detection object 71 and recognition of an image of the image recognition object 72.

The imaging optical system 25A includes the wideband bandpass filter 52A and the IR separation mirror 54. The IR separation mirror 54 is a light separation device that separates, from each other, position detection light (the scattered light La of the position detection illumination light 42) and image recognition light (the image recognition illumination light 43) that have entered through the projection optical system 4. The first imaging device 22A is disposed on a light path of the position detection light separated by the IR separation mirror 54, and the second imaging device 22B is disposed on a light path of the image recognition light separated by the IR separation mirror 54.

In the present embodiment, as illustrated in FIG. 16, respective wavelength bands of the position detection illumination light 42 and the image recognition illumination light 43 are different from a wavelength band of the image projection illumination light 41, and respective center wavelengths of the position detection illumination light 42 and the image recognition illumination light 43 are different from each other.

The wideband bandpass filter 52A is provided to separate the image projection illumination light 41 from the position detection illumination light 42 and the image recognition illumination light 43. For example, as illustrated in FIG. 16, the wideband bandpass filter 52A has a transmission characteristic of suppressing the image projection illumination light 41 and allowing respective center bands of the position detection illumination light 42 and the image recognition illumination light 43 to be transmitted therethrough.

For example, as illustrated in FIG. 17, the IR separation mirror 54 has a reflection characteristic allowing the position detection illumination light 42 to be transmitted therethrough and reflecting the image recognition illumination light 43.

Specifically, the center wavelength of the position detection illumination light 42 may be about 780 nm. The center wavelength of the image recognition illumination light 43 may be about 850 nm. A cut-off wavelength of the IR separation mirror 54 may be about 810 nm. In general, 20 nm is enough for a mirror having a sharp cut characteristic to be able to separate bands; therefore, in the case of the wavelength characteristics described above, the IR separation mirror 54 is able to separate the position detection illumination light 42 and the image recognition illumination light 43.

2.2 Effects

As described above, according to the present embodiment, the first imaging device 22A for position detection and the second imaging device 22B for the image recognition are provided, and the center wavelengths of the position detection illumination light 42 and the image recognition illumination light 43 are set to different wavelengths from each other so that they are imaged separately; therefore, it is possible to perform image recognition and position detection temporally at the same time. Accordingly, it is unnecessary to perform temporal switching between the image recognition mode and the position detection mode as in the first embodiment.

The other configurations, operations, and effects may be broadly similar to those of the display apparatus with detection function according to the first embodiment.

3. THIRD EMBODIMENT

Next, a display apparatus with detection function according to a third embodiment of the present disclosure is described. It is to be noted that in the following, substantially the same component as that of the display apparatus with detection function according to the first or second embodiment is assigned the same reference numeral, and description of the component is omitted accordingly.

3.1 Configuration and Operation

In the second embodiment, the center wavelengths of the position detection illumination light 42 and the image recognition illumination light 43 are set to different wavelengths from each other, and the first imaging device 22A for position detection and the second imaging device 22B for the image recognition are provided, thereby it is possible to perform image recognition and position detection temporally at the same time. In contrast, in the present embodiment, it is intended to provide a display apparatus with detection function that is able to perform image recognition and position detection temporally at the same time with only one imaging device 22.

FIG. 18 illustrates an example of a light receiving pattern of the imaging device 22 in the display apparatus with detection function according to the third embodiment of the present disclosure. FIG. 19 illustrates an example of spectra of pieces of illumination light and a light receiving characteristic of a first light receiving region IR1 of the imaging device 22 in the display apparatus with detection function according to the third embodiment. FIG. 20 illustrates an example of spectra of pieces of illumination light and a light receiving characteristic of a second light receiving region IR2 of the imaging device 22 in the display apparatus with detection function according to the third embodiment.

An imaging optical system of the imaging unit 5 in the present embodiment may be substantially the same as the imaging optical system 25 (FIG. 4) in the first embodiment. However, in the present embodiment, a light receiving region of the imaging device 22 is divided into the first light receiving region IR1 that the position detection illumination light 42 enters and the second light receiving region IR2 that the image recognition illumination light 43 enters as illustrated in FIG. 18. For example, optical filters corresponding to the first light receiving region IR1 and the second light receiving region IR2 may be provided on a light receiving surface of the imaging device 22 so that pieces of light with different wavelengths separately enter the first light receiving region IR1 and the second light receiving region IR2. It is to be noted that the light receiving pattern illustrated in FIG. 18 is an example, and the imaging device 22 may have a pattern different from this.

In the present embodiment, as with the second embodiment, respective wavelength bands of the position detection illumination light 42 and the image recognition illumination light 43 are different from a wavelength band of the image projection illumination light 41, and, as illustrated in FIGS. 19 and 20, the center wavelength of the position detection illumination light 42 is different from the center wavelength of the image recognition illumination light 43.

For example, as illustrated in FIG. 19, the first light receiving region IR1 has a light receiving characteristic of suppressing the passage of the image recognition illumination light 43. Furthermore, for example, as illustrated in FIG. 20, the second light receiving region IR2 has a light receiving characteristic of suppressing the passage of the position detection illumination light 42.

The imaging device 22 outputs respective results of imaging in the first and second light receiving regions IR1 and IR2 to the detected-image processing unit 6. The detected-image processing unit 6 analyzes the respective results of imaging in the regions, and performs detection of a position of the position detection object 71 and recognition of an image of the image recognition object 72.

3.2 Effects

As described above, according to the present embodiment, the first light receiving region IR1 for position detection and the second light receiving region IR2 for image recognition that differ in the light receiving band are provided in the imaging device 22, and the center wavelengths of the position detection illumination light 42 and the image recognition illumination light 43 are set to different wavelengths from each other so that they are imaged spatially separately; therefore, it is possible to perform image recognition and position detection temporally at the same time with one imaging device 22. Accordingly, it is unnecessary to perform temporal switching between the image recognition mode and the position detection mode as in the first embodiment.

The other configurations, operations, and effects may be broadly similar to those of the display apparatus with detection function according to the first or second embodiment.

4. FOURTH EMBODIMENT

Next, a display apparatus with detection function according to a fourth embodiment of the present disclosure is described. It is to be noted that in the following, substantially the same component as that of the display apparatus with detection function according to any of the first to third embodiments is assigned the same reference numeral, and description of the component is omitted accordingly.

4.1 Configuration and Operation

In the displays with detection function according to the first to third embodiments, the image recognition illumination light 43 from the image recognition illumination unit 3 and the position detection illumination light 42 from the position detection illumination unit 2 are in a wavelength band that is in the near infrared range, and thus are non-visible light. Accordingly, it is possible to perform detection of a position of the position detection object 71 and recognition of an image of the image recognition object 72 without affecting the visibility of an image projected that is visible light from a projector. Incidentally, as will be described below, near-infrared light makes small differences in reflectance for each color of an object of irradiation; therefore, it is difficult to recognize the color of the position detection object 71 or the image recognition object 72. Meanwhile, if near-infrared light in a wavelength band of about 730 nm or more but not exceeding 790 nm is used, the differences in reflectance for each color become relatively large. Therefore, to recognize differences in color, it is preferable that at least one of the image recognition illumination light 43 or the position detection illumination light 42 has a wavelength of 730 nm or more but not exceeding 790 nm.

FIG. 21 illustrates an example of wavelength dependence of the reflectance of a color printed material. It is to be noted that in FIG. 21, the horizontal axis indicates a wavelength (nm), and the vertical axis indicates a spectral reflectance (relative value (a.u.)). FIG. 21 illustrates respective spectral reflectances for blue, green, red, and yellow colors in the color printed material.

In general, surveillance cameras and other infrared detectors, etc. select and use, as illumination light for detection, wavelengths that are in an absolutely non-visible range for human beings, such as 850 nm and 940 nm that are widely in circulation. However, if an infrared range of wavelengths like 800 nm or more are used as the image recognition illumination light 43 and the position detection illumination light 42 in the display apparatus with detection function according to the present disclosure, the differences in reflectance for each color become smaller as illustrated in FIG. 21, and it becomes difficult to capture a feature point at the time of image recognition or position detection. On the other hand, in a wavelength band of about 790 nm or less in the near infrared range, the differences in reflectance due to differences in color become relatively large (yellow>red>green>blue). Accordingly, it becomes possible to capture a feature point of each color and improve accuracy of the recognition rate. Qualitatively, a short wavelength easily makes the differences in reflectance for color. However, if a wavelength is too short, the problem of visibility occurs. The reason non-visible light is used as the image recognition illumination light 43 and the position detection illumination light 42 is to prevent a projected image that is visible light from the projector from being affected by image recognition and position detection. If the image recognition illumination light 43 and the position detection illumination light 42 are below 730 nm, they are close to a wavelength band that the human eye is able to detect as red color. Accordingly, the image recognition illumination light 43 and the position detection illumination light 42 are preferably 730 nm or more. From the above, the image recognition illumination light 43 and the position detection illumination light 42 are preferably 730 nm or more. As described above, to manage both not to affect the visibility and to recognize the differences in color, at least one of the image recognition illumination light 43 or the position detection illumination light 42 has preferably a wavelength of 730 nm or more but not exceeding 790 nm. It is conceivable that there are demands for recognizing differences in color particularly for purposes of use for image recognition. Therefore, it is preferable that particularly the wavelength of the image recognition illumination light 43 be 730 nm or more but not exceeding 790 nm.

FIG. 22 illustrates an example of an actual result of imaging of color printed materials in a case of use of illumination light of a wavelength of 785 nm. FIG. 23 illustrates an example of an actual result of imaging of the color printed materials in a case of use of illumination light of a wavelength of 730 nm.

In FIGS. 22 and 23, the color printed materials are card-like printed materials; for example, cards with words including "Blue" drawn have the words printed in blue, and cards with words including "Green" drawn have the words printed in green. In FIGS. 22 and 23, four cards with "Blue", "Yellow", "Red", and "Green" drawn are arranged in a horizontal direction (a right-and-left direction) in this order from the left; the cards arranged in a vertical direction (an up-and-down direction) have the same color, and yet differ slightly in density and tone. It is to be noted that although not illustrated, in a case where illumination light of a wavelength of 830 nm is used, the colors are about the same in reflectance, and are in a state where the words are indistinguishable. In the case where illumination light of a wavelength of 785 nm is used (FIG. 22), the words in the colors is likely to be distinguishable. In the case where illumination light of a wavelength of 730 nm is used (FIG. 23), the words in the colors is likely to be more distinguishable. In particular, the cards with "Blue" and "Green" are clearly seen. By taking advantage of such characteristics, it becomes possible to build a system having a good detection rate.

4.2 Effects

As described above, according to the present embodiment, by optimizing the wavelength bands of the image recognition illumination light 43 and the position detection illumination light 42, it becomes possible to obtain a high-contrast gray scale image when imaging for image recognition and position detection is performed. Accordingly, it is possible to perform accurate image recognition in combination with a feature-point extracting technique.

The other configurations, operations, and effects may be broadly similar to those of the display apparatus with detection function according to any of the first to third embodiments.

5. OTHER EMBODIMENTS

The technology according to the present disclosure is not limited to the above description of the embodiments, and various modifications are possible.

For example, this technology may have the following configurations.

(1)
A display apparatus with detection function, including:
a first illumination unit that outputs first illumination light;
a light valve that generates image light by modulating the first illumination light on the basis of image data;
a projection optical system that projects the image light onto a projection plane;
a second illumination unit that outputs second illumination light used for position detection of a position detection object on the projection plane;
a third illumination unit that outputs third illumination light used for image recognition of an image recognition object on the projection plane;
an imaging unit where the second illumination light and the third illumination light enter through the projection optical system, and includes an imaging device disposed at an optically conjugate position with the light valve; and
an image processing unit that performs position detection of the position detection object and image recognition of the image recognition object on the basis of a result of imaging by the imaging unit.

(2)
The display apparatus with detection function according to (1), in which an output diffusion angle of the third illumination light in a direction vertical to the projection plane is greater than an output diffusion angle of the second illumination light in a direction vertical to the projection plane.

(3)
The display apparatus with detection function according to (2), in which the output diffusion angle of the third illumination light is ten times or more as large as the output diffusion angle of the second illumination light.

(4)
The display apparatus with detection function according to any one of (1) to (3), in which an output position of the third illumination light in the third illumination unit is farther from the projection plane than an output position of the second illumination light in the second illumination unit.

(5)
The display apparatus with detection function according to any one of (1) to (4), in which
an output position of the image light in the projection optical system is farther from the projection plane than an output position of the second illumination light in the second illumination unit, and
an output position of the third illumination light in the third illumination unit is farther from the projection plane than the output position of the image light in the projection optical system.

(6)
The display apparatus with detection function according to any one of (1) to (5), in which the third illumination unit outputs the third illumination light to allow an entire projection area of the image light on the projection plane to be illuminated with the third illumination light.

(7)
The display apparatus with detection function according to any one of (1) to (6), in which the second illumination unit outputs, as the second illumination light, light substantially parallel to the projection plane from a position higher than a height of a predetermined number of the image recognition objects stacked on top of another on the projection plane.

(8)
The display apparatus with detection function according to any one of (1) to (7), in which respective wavelength bands of the second illumination light and the third illumination light are different from a wavelength band of the first illumination light, and a center wavelength of the second illumination light and a center wavelength of the third illumination light are substantially the same.

(9)
The display apparatus with detection function according to (8), further including an illumination control unit that controls the second illumination unit and the third illumination unit to allow only the second illumination light, of the second illumination light and the third illumination light, to be outputted, in a position detection mode in which the image processing unit performs position detection of the position detection object, and to allow at least the third illumination light, of the second illumination light and the third illumination light, to be outputted, in an image recognition mode in which the image processing unit performs image recognition of the image recognition object.

(10)
The display apparatus with detection function according to (9), in which the illumination control unit and the image processing unit perform switching between the image recognition mode and the position detection mode on the basis of a change of an image content to be projected onto the projection plane.

(11)
The display apparatus with detection function according to (10), in which
the image content is an image pertaining to a game, and
the illumination control unit and the image processing unit perform switching between the image recognition mode and the position detection mode on the basis of progress of the game.

(12)
The display apparatus with detection function according to (9), in which the illumination control unit and the image processing unit make a transition to the position detection mode in a case where when in the image recognition mode, the image processing unit has recognized that the image recognition object with a predetermined design has been disposed at a specific position.

(13)
The display apparatus with detection function according to (9), in which the illumination control unit and the image processing unit make a transition to the position detection mode in a case where when in the image recognition mode, the image processing unit has recognized a predetermined graphic pattern at several points at the same time.

(14)
The display apparatus with detection function according to (9), in which
the image processing unit performs, when in the image recognition mode, image recognition of the image recognition object within a predetermined region on the projection plane and detection of a predetermined motion of the position detection object outside the predetermined region on the projection plane, and performs, when in the position detection mode, position detection of the position detection object at least within the predetermined region, and
the illumination control unit causes both the second illumination light and the third illumination light to be outputted when in the image recognition mode, and makes a transition to the position detection mode in a case where when in the image recognition mode, the image processing unit has detected that the predetermined motion outside the predetermined region has been detected.

(15)
The display apparatus with detection function according to any one of (1) to (7), in which respective wavelength bands of the second illumination light and the third illumination light are different from a wavelength band of the first illumination light, and a center wavelength of the second illumination light and a center wavelength of the third illumination light are different from each other.

(16)
The display apparatus with detection function according to (15), in which the imaging device includes:
a first imaging device that the second illumination light enters; and
a second imaging device that the third illumination light enters.

(17)
The display apparatus with detection function according to (16), in which
the imaging unit further includes a light separation device that separates the second illumination light and the third illumination light that have entered through the projection optical system from each other, and
the first imaging device is disposed on a light path of the second illumination light separated by the light separation device, and the second imaging device is disposed on a light path of the third illumination light separated by the light separation device.

(18)
The display apparatus with detection function according to (15), in which the imaging device has:
a first light receiving region that the second illumination light enters; and
a second light receiving region that the third illumination light enters.

(19)
The display apparatus with detection function according to any one of (1) to (18), further including a display control unit that supplies the light valve with the image data including information relevant to an image of the image recognition object recognized by the image processing unit.

(20)
The display apparatus with detection function according to any one of (1) to (19), in which at least one of the second illumination light or the third illumination light has a wavelength of 730 nm or more but not exceeding 790 nm.

The invention claimed is:

1. A display apparatus with detection function, comprising:
a first illumination unit that outputs first illumination light;
a light valve that generates image light by modulating the first illumination light on a basis of image data;
a projection optical system that projects the image light onto a projection plane;
a second illumination unit that outputs second illumination light used for position detection of a position detection object on the projection plane;
a third illumination unit that outputs third illumination light used for image recognition of an image recognition object on the projection plane;
an imaging unit where the second illumination light and the third illumination light enter through the projection optical system, the imaging unit including an imaging device disposed at an optically conjugate position with the light valve; and an image processing unit that performs the position detection of the position detection object and the image recognition of the image recognition object on a basis of a result of imaging by the imaging unit.

2. The display apparatus with the detection function according to claim 1, wherein an output diffusion angle of the third illumination light in a direction vertical to the projection plane is greater than an output diffusion angle of the second illumination light in the direction vertical to the projection plane.

3. The display apparatus with the detection function according to claim 2, wherein the output diffusion angle of the third illumination light is ten times or more as large as the output diffusion angle of the second illumination light.

4. The display apparatus with the detection function according to claim 1, wherein an output position of the third illumination light in the third illumination unit is farther from the projection plane than an output position of the second illumination light in the second illumination unit.

5. The display apparatus with the detection function according to claim 1, wherein
an output position of the image light in the projection optical system is farther from the projection plane than an output position of the second illumination light in the second illumination unit, and
an output position of the third illumination light in the third illumination unit is farther from the projection plane than the output position of the image light in the projection optical system.

6. The display apparatus with the detection function according to claim 1, wherein the third illumination unit outputs the third illumination light to allow an entire projection area of the image light on the projection plane to be illuminated with the third illumination light.

7. The display apparatus with the detection function according to claim 1, wherein the second illumination unit outputs, as the second illumination light, light substantially parallel to the projection plane from a position higher than a height of a predetermined number of image recognition objects stacked on top of another on the projection plane.

8. The display apparatus with the detection function according to claim 1, wherein respective wavelength bands of the second illumination light and the third illumination light are different from a wavelength band of the first illumination light, and a center wavelength of the second illumination light and a center wavelength of the third illumination light are substantially the same.

9. The display apparatus with the detection function according to claim 8, further comprising an illumination control unit that controls the second illumination unit and the third illumination unit to allow only the second illumination light, of the second illumination light and the third illumination light, to be outputted, in a position detection mode in which the image processing unit performs the position detection of the position detection object, and to allow at least the third illumination light, of the second illumination light and the third illumination light, to be outputted, in an image recognition mode in which the image processing unit performs the image recognition of the image recognition object.

10. The display apparatus with the detection function according to claim 9, wherein the illumination control unit and the image processing unit perform switching between the image recognition mode and the position detection mode on a basis of a change of an image content to be projected onto the projection plane.

11. The display apparatus with the detection function according to claim 10, wherein
the image content is an image pertaining to a game, and
the illumination control unit and the image processing unit perform switching between the image recognition mode and the position detection mode on a basis of progress of the game.

12. The display apparatus with the detection function according to claim 9, wherein the illumination control unit and the image processing unit make a transition to the position detection mode in a case where when in the image recognition mode, the image processing unit has recognized that the image recognition object with a predetermined design has been disposed at a specific position.

13. The display apparatus with the detection function according to claim 9, wherein the illumination control unit and the image processing unit make a transition to the position detection mode in a case where when in the image recognition mode, the image processing unit has recognized a predetermined graphic pattern at several points at the same time.

14. The display apparatus with the detection function according to claim 9, wherein
the image processing unit performs, when in the image recognition mode, the image recognition of the image recognition object within a predetermined region on the projection plane and detection of a predetermined motion of the position detection object outside the predetermined region on the projection plane, and performs, when in the position detection mode, the position detection of the position detection object at least within the predetermined region, and
the illumination control unit causes both the second illumination light and the third illumination light to be outputted when in the image recognition mode, and makes a transition to the position detection mode in a case where when in the image recognition mode, the image processing unit has detected that the predetermined motion outside the predetermined region has been detected.

15. The display apparatus with the detection function according to claim 1, wherein respective wavelength bands of the second illumination light and the third illumination light are different from a wavelength band of the first illumination light, and a center wavelength of the second illumination light and a center wavelength of the third illumination light are different from each other.

16. The display apparatus with the detection function according to claim 15, wherein the imaging device includes:
a first imaging device that the second illumination light enters; and
a second imaging device that the third illumination light enters.

17. The display apparatus with the detection function according to claim 16, wherein
the imaging unit further includes a light separation device that separates the second illumination light and the third illumination light that have entered through the projection optical system from each other, and
the first imaging device is disposed on a light path of the second illumination light separated by the light separation device, and the second imaging device is disposed on a light path of the third illumination light separated by the light separation device.

18. The display apparatus with the detection function according to claim 15, wherein the imaging device has:
- a first light receiving region that the second illumination light enters; and
- a second light receiving region that the third illumination light enters.

19. The display apparatus with the detection function according to claim 1, further comprising a display control unit that supplies the light valve with the image data including information relevant to an image of the image recognition object recognized by the image processing unit.

20. The display apparatus with the detection function according to claim 1, wherein at least one of the second illumination light or the third illumination light has a wavelength of 730 nm or more but not exceeding 790 nm.

* * * * *